US012741216B2

(12) United States Patent
Takubo et al.

(10) Patent No.: US 12,741,216 B2
(45) Date of Patent: Sep. 22, 2026

(54) NON-TRANSITORY COMPUTER READABLE MEDIUM, INFORMATION PROCESSING METHOD, AND INFORMATION PROCESSING SYSTEM

(71) Applicant: CYGAMES, INC., Tokyo (JP)

(72) Inventors: Gen Takubo, Tokyo (JP); Yusuke Sasano, Tokyo (JP); Masayuki Nagata, Tokyo (JP); Masaya Nakajima, Tokyo (JP)

(73) Assignee: CYGAMES, INC., Tokyo (JP)

( * ) Notice: Subject to any disclaimer, the term of this patent is extended or adjusted under 35 U.S.C. 154(b) by 280 days.

(21) Appl. No.: 18/437,912

(22) Filed: Feb. 9, 2024

(65) Prior Publication Data

US 2024/0173625 A1 May 30, 2024

Related U.S. Application Data

(63) Continuation of application No. PCT/JP2022/030789, filed on Aug. 12, 2022.

(30) Foreign Application Priority Data

Aug. 13, 2021 (JP) ................................ 2021-131934

(51) Int. Cl.
*A63F 13/69* (2014.01)
*A63F 13/533* (2014.01)
*A63F 13/58* (2014.01)

(52) U.S. Cl.
CPC .............. *A63F 13/69* (2014.09); *A63F 13/58* (2014.09); *A63F 13/533* (2014.09)

(58) Field of Classification Search
CPC ......... A63F 13/69; A63F 13/58; A63F 13/533
See application file for complete search history.

(56) References Cited

U.S. PATENT DOCUMENTS 10,894,213 B2 * 1/2021 Tinari ..................... A63F 13/57
12,193,832 B2 * 1/2025 Ogawa .................... A63F 13/58
(Continued)

FOREIGN PATENT DOCUMENTS

JP 5642309 B1 12/2014

OTHER PUBLICATIONS

International Search Report issued in PCT/JP2022/030789 on Sep. 13, 2022 (3 pages).

(Continued)

*Primary Examiner* — Ankit B Doshi
(74) *Attorney, Agent, or Firm* — Osha Bergman Watanabe & Burton LLP

(57) ABSTRACT

A non-transitory computer readable medium stores a program causing a computer to execute: updating predetermined information in accordance with a game status; and setting an upper limit of a parameter of a game medium based on the predetermined information, wherein, on setting the upper limit, when the predetermined information is updated with a preset special condition being not satisfied, the upper limit can be set to a reference value corresponding to the updated predetermined information, when the special condition is satisfied, the upper limit can be set to a value exceeding the reference value corresponding to the predetermined information at that time by a predetermined value, and when the predetermined information is updated with the special condition being satisfied, the upper limit can be set to a value exceeding the reference value corresponding to the updated predetermined information by the predetermined value.

4 Claims, 14 Drawing Sheets

(56) References Cited

U.S. PATENT DOCUMENTS

| | | | | |
|---|---|---|---|---|
| 2015/0065255 | A1* | 3/2015 | Otomo | A63F 13/69 463/43 |
| 2015/0080123 | A1* | 3/2015 | Motokura | A63F 13/847 463/31 |
| 2016/0271499 | A1* | 9/2016 | Higo | A63F 13/822 |
| 2017/0326452 | A1* | 11/2017 | Kikuchi | G07F 17/3251 |
| 2020/0306649 | A1* | 10/2020 | Aita | A63F 13/798 |
| 2020/0391117 | A1* | 12/2020 | Ito | A63F 13/58 |
| 2021/0187396 | A1* | 6/2021 | Sakamoto | A63F 13/537 |
| 2024/0131435 | A1* | 4/2024 | Hoshino | A63F 13/822 |

OTHER PUBLICATIONS

Written Opinion of the International Searching Authority issued in PCT/JP2022/030789 on Sep. 13, 2022 (3 pages).

About specification description and item of limit break. Strategy summary of Grimms Notes wiki [online] Mar. 3, 2016 https://www.dopr.net/article/571895257759 7440, [retrieval date: Feb. 17, 2022] (6 pages).

"Grimm Notes" No need to break limit before evolution. No change in required number of cards. Rarity 3 star heroes become stronger than 5 star heroes. Playing Applido smartphone game without charge [online] Jan. 31, 2016 http://smartgameapplication.blog.fc2.com/blog-entry-64.html, [retrieval date: Feb. 17, 2022] (6 pages).

[Tensura] Tips for Efficiently Raising Levels! Level up with earning coins and training! [Suraten]. Koryaku Daihyakka [online] Feb. 19, 2019 https://gamepedia.jp/tensura/archives/260, [retrieval date: Feb. 17, 2022] (9 pages).

Office Action issued in the counterpart Japanese Patent Application No. 2021-131934, mailed on Mar. 8, 2022 (6 pages).

Office Action issued in the counterpart Japanese Patent Application No. 2021-131934, mailed on Jun. 28, 2022 (6 pages).

* cited by examiner

| CHARACTER ID | LIMIT BREAK STAGE | BREAK POSSIBLE Lv | REQUIRED ITEM | | |
|---|---|---|---|---|---|
| | | | ITEM 1 | ITEM 2 | ITEM 3 |
| 00001 | 1-ST STATE | +3 | 300000 | 500000 | 50 |
| | 2-ND STAGE | +5 | 500000 | 1000000 | 100 |
| | ... | ... | ... | ... | ... |

FIG.6

NON-TRANSITORY COMPUTER READABLE MEDIUM, INFORMATION PROCESSING METHOD, AND INFORMATION PROCESSING SYSTEM

CROSS REFERENCE TO RELATED APPLICATIONS

This application is a continuation application of International Application No. PCT/JP2022/030789, filed on Aug. 12, 2022, which claims priority to Japanese Patent Application No. 2021-131934, filed on Aug. 13, 2021, the entire contents of which are incorporated by reference herein.

BACKGROUND ART

Technical Field

The present invention relates to an information processing program, an information processing method, and an information processing system.

For example, Patent Literature 1 discloses a game in which game media on which the same character is drawn are combined, thereby making it possible to perform upper-limit release for raising the maximum value of the level of the game media.

CITATION LIST

Patent Literature

Patent Literature 1: JP 5642309 B

SUMMARY OF INVENTION

Technical Problem

Incidentally, there are games in which the maximum value of the level of a game medium changes in accordance with the player's game status. In such games, if the maximum value of the level raised through upper-limit release is fixed while the maximum value of the level changes in accordance with the game status, the maximum value of the level catches up with the level after the upper-limit release, due to another factor (a parameter that changes in accordance with the player's game status), even though the upper-limit release has been performed by consuming a cost (s). In this case, there is a possibility that a sense of loss is suffered by the player.

An object of the present invention is to provide an information processing program, an information processing method, and an information processing system capable of suppressing the occurrence of a sense of loss of a player.

Solution to Problem

In order to solve the above-described problem, provided is an information processing program causing a computer to execute: processing for updating predetermined information in accordance with the game status of a player; processing for setting an upper limit of a parameter of a game medium on the basis of the predetermined information; and processing for changing the parameter by using the set upper limit as a limit, wherein, in the processing for setting the upper limit, in the case where the predetermined information is updated with a preset special condition being not satisfied, the upper limit of a particular game medium can be set to a reference value corresponding to the updated predetermined information, in the case where the special condition is satisfied, the upper limit of the particular game medium can be set to a value that exceeds the reference value corresponding to the predetermined information at that time by a predetermined value, and in the case where the predetermined information is updated with the special condition being satisfied, the upper limit of the particular game medium can be set to a value that exceeds the reference value corresponding to the updated predetermined information by the predetermined value.

Furthermore, the information processing program above may further cause the computer to execute processing for consuming a cost when the parameter is changed, wherein the consumption amount of the cost required to change the parameter is constant irrespective of whether the special condition is satisfied or not.

Furthermore, in the information processing program above, wherein, in the case where the predetermined information is updated with the special condition being satisfied, in the processing for setting the upper limit of the particular game medium, the predetermined value may be added to the reference value corresponding to the updated predetermined information.

In order to solve the above-described problem, provided is an information processing method that is executed by one or a plurality of computers, the method comprising: processing for updating predetermined information in accordance with the game status of a player; processing for setting an upper limit of a parameter of a game medium on the basis of the predetermined information; and processing for changing the parameter by using the set upper limit as a limit, wherein, in the processing for setting the upper limit, in the case where the predetermined information is updated with a preset special condition being not satisfied, the upper limit of a particular game medium can be set to a reference value corresponding to the updated predetermined information, in the case where the special condition is satisfied, the upper limit of the particular game medium can be set to a value that exceeds the reference value corresponding to the predetermined information at that time by a predetermined value, and in the case where the predetermined information is updated with the special condition being satisfied, the upper limit of the particular game medium can be set to a value that exceeds the reference value corresponding to the updated predetermined information by the predetermined value.

In order to solve the above-described problem, provided is an information processing system comprising one or a plurality of computers, the computers executing: processing for updating predetermined information in accordance with the game status of a player; processing for setting an upper limit of a parameter of a game medium on the basis of the predetermined information; and processing for changing the parameter by using the set upper limit as a limit, wherein, in the processing for setting the upper limit, in the case where the predetermined information is updated with a preset special condition being not satisfied, the upper limit of a particular game medium can be set to a reference value corresponding to the updated predetermined information, in the case where the special condition is satisfied, the upper limit of the particular game medium can be set to a value that exceeds the reference value corresponding to the predetermined information at that time by a predetermined value, and in the case where the predetermined information is updated with the special condition being satisfied, the upper limit of the particular game medium can be set to a value that exceeds the reference value corresponding to the updated predetermined information by the predetermined value.

Effects of Disclosure

According to the present invention, it is possible to suppress the occurrence of a sense of loss suffered by a player.

BRIEF DESCRIPTION OF DRAWINGS

FIG. 6 is a view showing list information for explaining a special condition for a particular character.

DESCRIPTION OF EMBODIMENT

One aspect of an embodiment of the present invention will be described in detail below with reference to the accompanying drawings. The dimensions, materials, other specific values, etc. given in this embodiment are merely examples for facilitating understanding, and do not limit the present invention unless otherwise specifically mentioned. Note that, in this specification and the drawings, duplication of description will be omitted by assigning identical reference signs to elements that have substantially the same functions and configurations, and elements that are not directly related to the present invention are not shown.

(Overall Configuration of Information Processing System S)

Figure 1:
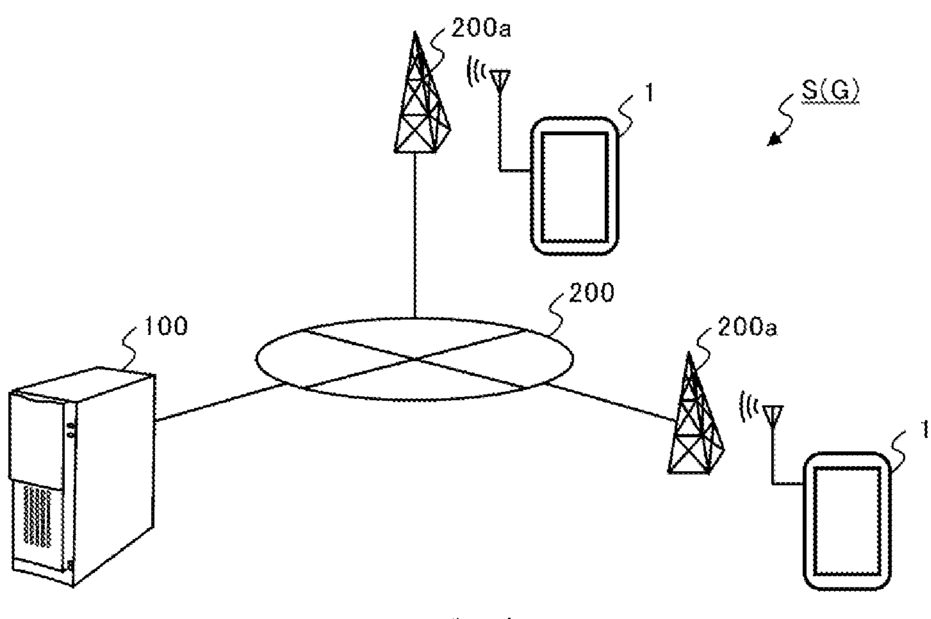
FIG. 1 is an explanatory view showing, in outline, the configuration of an information processing system.

FIG. 1 is an explanatory view showing, in outline, the configuration of an information processing system S. The information processing system S is a so-called client-server system that includes player terminals 1, a server 100, and a communication network 200 having communication base stations 200*a*.

Each of the player terminals (information processing devices) 1 can establish communication with the server 100 via the communication network 200. The player terminals 1 widely include electronic appliances that can be communicatively connected to the server 100 by wire or wirelessly. Examples of the player terminals 1 include, for example, smartphones, mobile phones, tablet devices, personal computers, game machines, or the like. In this embodiment, a description will be given of a case in which smartphones are used as the player terminals 1.

The server 100 is communicatively connected to a plurality of player terminals 1. The server 100 accumulates various kinds of information (hereinafter, referred to as player information) for each player identification information (hereinafter, referred to as player ID) used to identify a player who plays a game.

The communication base stations 200*a* are connected to the communication network 200 and send information to and receive information from the player terminals 1 wirelessly. The communication network 200 is configured of a mobile-phone network, an Internet network, a local area network (LAN), a dedicated line, or the like, to realize wireless or wired communication connection between the player terminals 1 and the server 100.

In the information processing system S according to this embodiment, each player terminal 1 and the server 100 function as game devices G. The player terminal 1 and the server 100 respectively play roles for controlling the proceeding of a game, whereby it is possible to proceed with the game through cooperation between the player terminal 1 and the server 100.

(Hardware Configuration of Player Terminal 1 and Server 100).

Figure 2A:
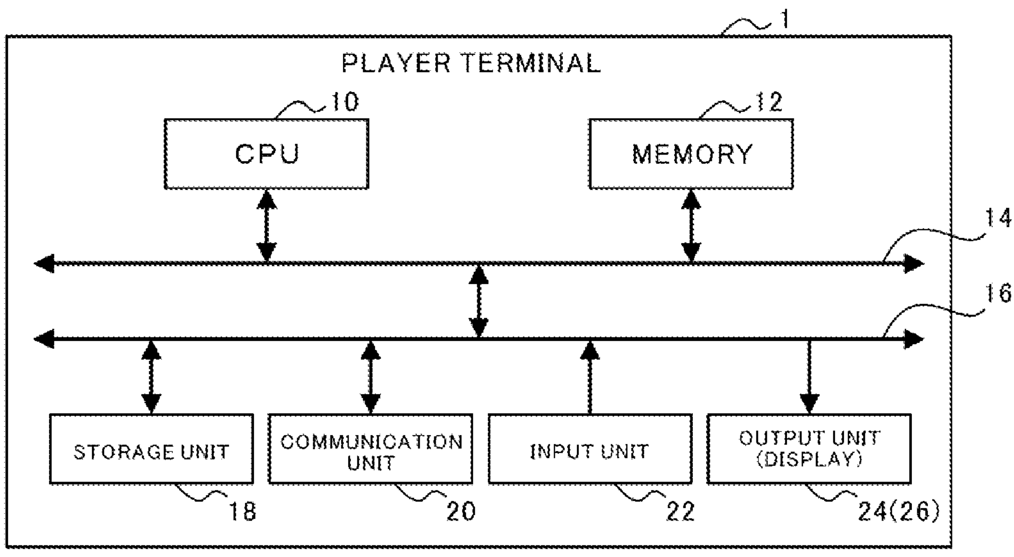
FIG. 2A is a diagram for explaining the hardware configuration of a player terminal.
Figure 2B:
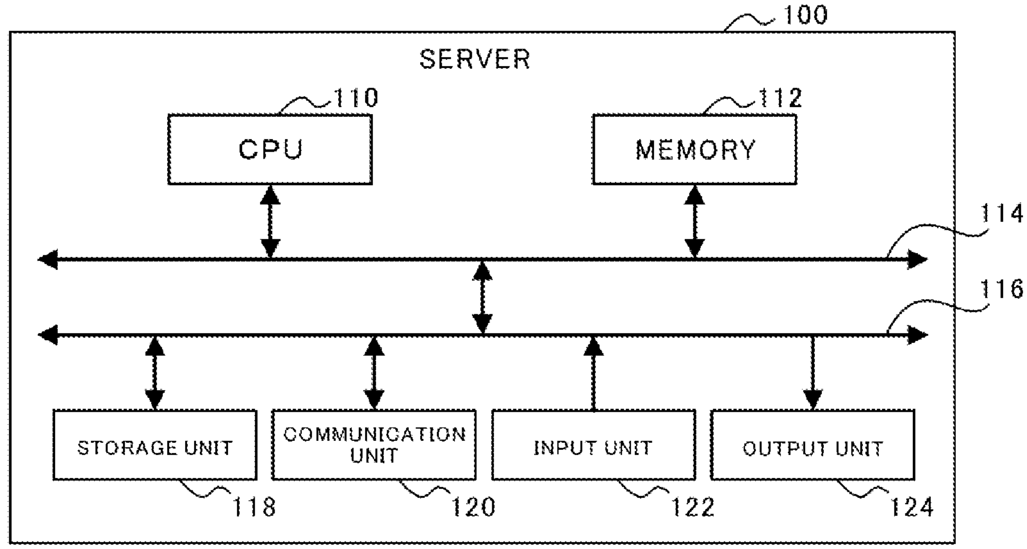
FIG. 2B is a diagram for explaining the hardware configuration of a server.

FIG. 2A is a diagram for explaining the hardware configuration of the player terminal 1. Furthermore, FIG. 2B is a diagram for explaining the hardware configuration of the server 100. As shown in FIG. 2A, the player terminal 1 is configured to include one or a plurality of central processing units (CPUs) 10, a memory 12, a bus 14, an input/output interface 16, a storage unit 18, a communication unit 20, an input unit 22, and an output unit 24.

Furthermore, as shown in FIG. 2B, the server 100 is configured to include one or a plurality of CPUs 110, a memory 112, a bus 114, an input/output interface 116, a storage unit 118, a communication unit 120, an input unit 122, and an output unit 124.

Note that the configurations and the functions of the CPU (s) 110, the memory 112, the bus 114, the input/output interface 116, the storage unit 118, the communication unit 120, the input unit 122, and the output unit 124 of the server 100 are substantially the same as those of the CPU (s) 10, the memory 12, the bus 14, the input/output interface 16, the storage unit 18, the communication unit 20, the input unit 22, and the output unit 24 of the player terminal 1, respectively. Therefore, the hardware configuration of the player terminal 1 will be described below, and a description of the hardware configuration of the server 100 will be omitted.

The CPU (s) 10 runs a program stored in the memory 12 to control the proceeding of the game. The memory 12 is configured of a read only memory (ROM) or a random access memory (RAM) and stores programs and various kinds of data needed for controlling the proceeding of the game. The memory 12 is connected to the CPU (s) 10 via the bus 14.

The input/output interface 16 is connected to the bus 14. The storage unit 18, the communication unit 20, the input unit 22, and the output unit 24 are connected to the input/output interface 16.

The storage unit 18 is configured of a semiconductor memory, such as a dynamic random access memory (DRAM), and stores various kinds of programs and data. At the player terminal 1, the programs and data stored in the storage unit 18 are loaded into the memory 12 (RAM) by the CPU (s) 10.

The communication unit 20 is communicatively connected to the communication base station 200*a* wirelessly, and sends information to and receives information from the server 100 via the communication network 200, such as various kinds of data and programs. At the player terminal 1, the programs etc. received from the server 100 are stored in the memory 12 or the storage unit 18.

The input unit 22 is configured of, for example, a touchscreen, buttons, a keyboard, a mouse, a cross key, or an analog controller with which player operations are input (operations are accepted). Alternatively, the input unit 22 may be a special controller provided in the player terminal 1 or connected (externally attached) to the player terminal 1. Alternatively, the input unit 22 may be configured of an acceleration sensor that detects tilting or movement of the player terminal 1 or a microphone that detects the speech of the player. That is, the input unit 22 may widely include devices that enable the player to input his or her intents in distinguishable manners.

The output unit 24 is configured to include a display device and a speaker. Note that the output unit 24 may be a device connected (externally attached) to the player terminal 1. In this embodiment, the player terminal 1 includes a display 26 as the output unit 24 and includes, as the input unit 22, a touchscreen provided in the display 26 so as to be overlaid thereon.

(Game Content)

Next, an example of the content of a game provided by the information processing system S (game device G) of this embodiment will be described. In this embodiment, so-called battle games in which ally characters battle with enemy characters are provided. Specifically, in the games of this embodiment, a plurality of ally characters are provided. The player selects some (here, five) ally characters from among the provided ally characters to organize a party. Furthermore, the player can play a plurality of kinds of battle games that have different enemy characters and different levels of difficulty. The object of a battle game is that the ally characters organized into the party defeat enemy characters to obtain rewards.

Figures 3A, 3B, 3C:
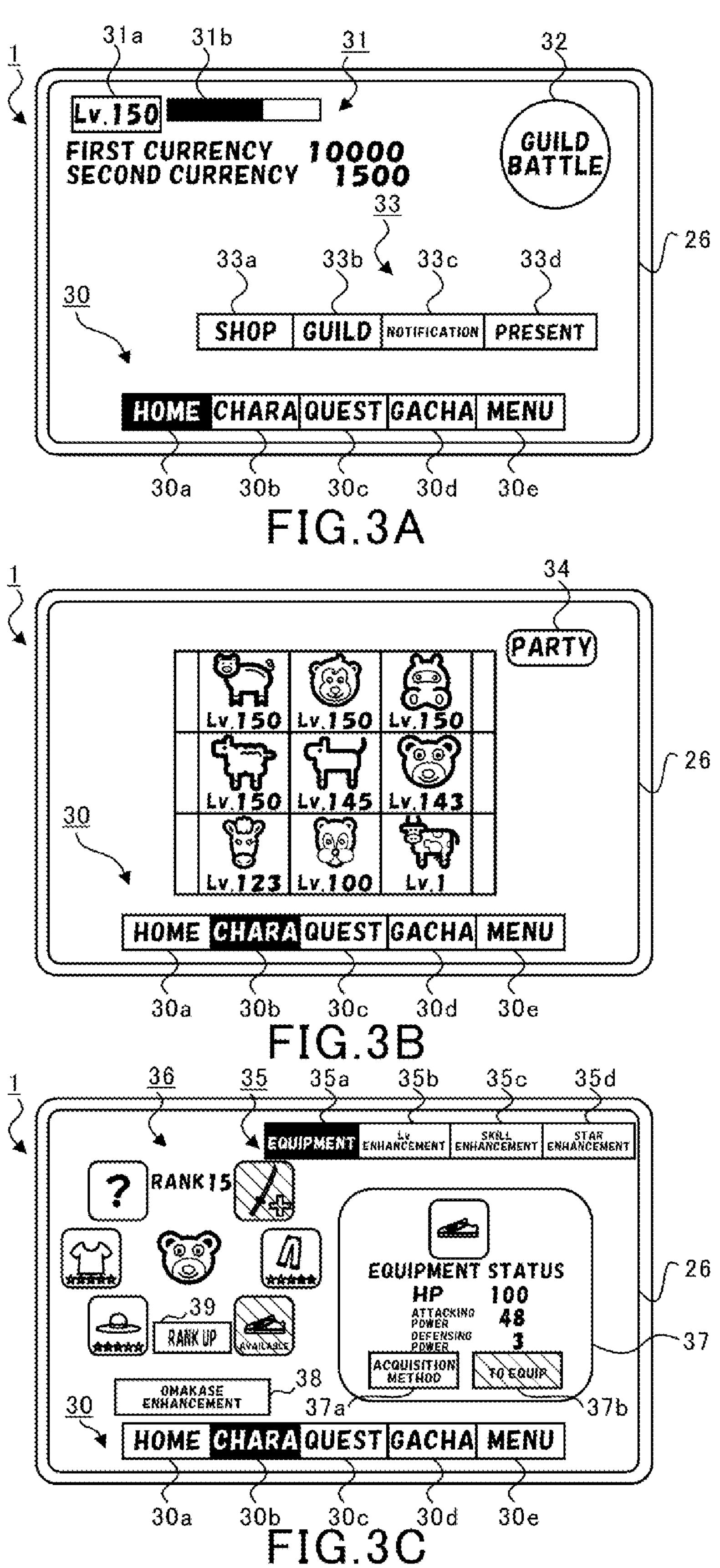
FIG. 3A is a view for explaining an example of a home screen.
FIG. 3B is a view for explaining an example of an ally-character confirmation screen.
FIG. 3C is a first view for explaining an example of an ally-character detail screen.
Figures 4A, 4B, 4C:
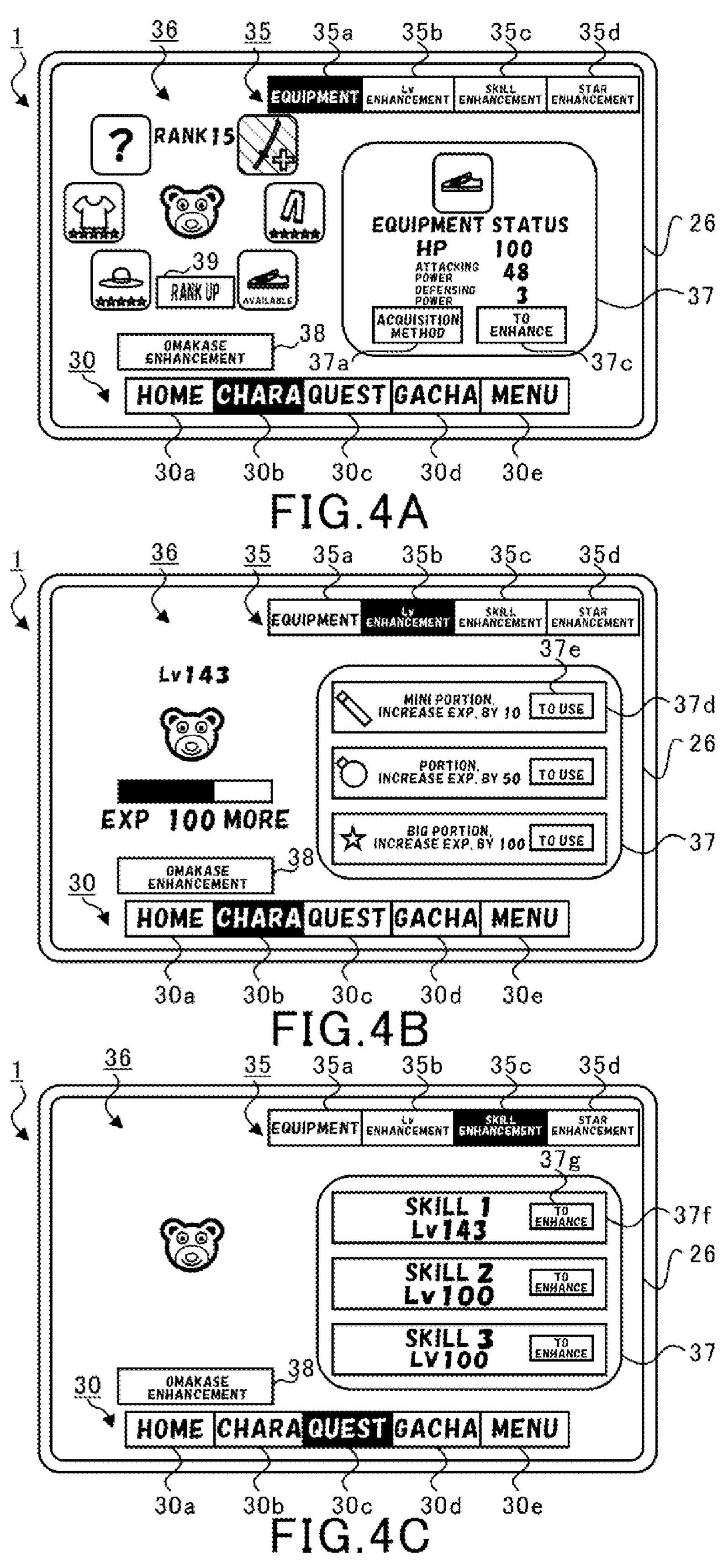
FIG. 4A is a second view for explaining an example of the ally-character detail screen.
FIG. 4B is a third view for explaining an example of the ally-character detail screen.
FIG. 4C is a fourth view for explaining an example of the ally-character detail screen.
Figures 5A, 5B, 5C:
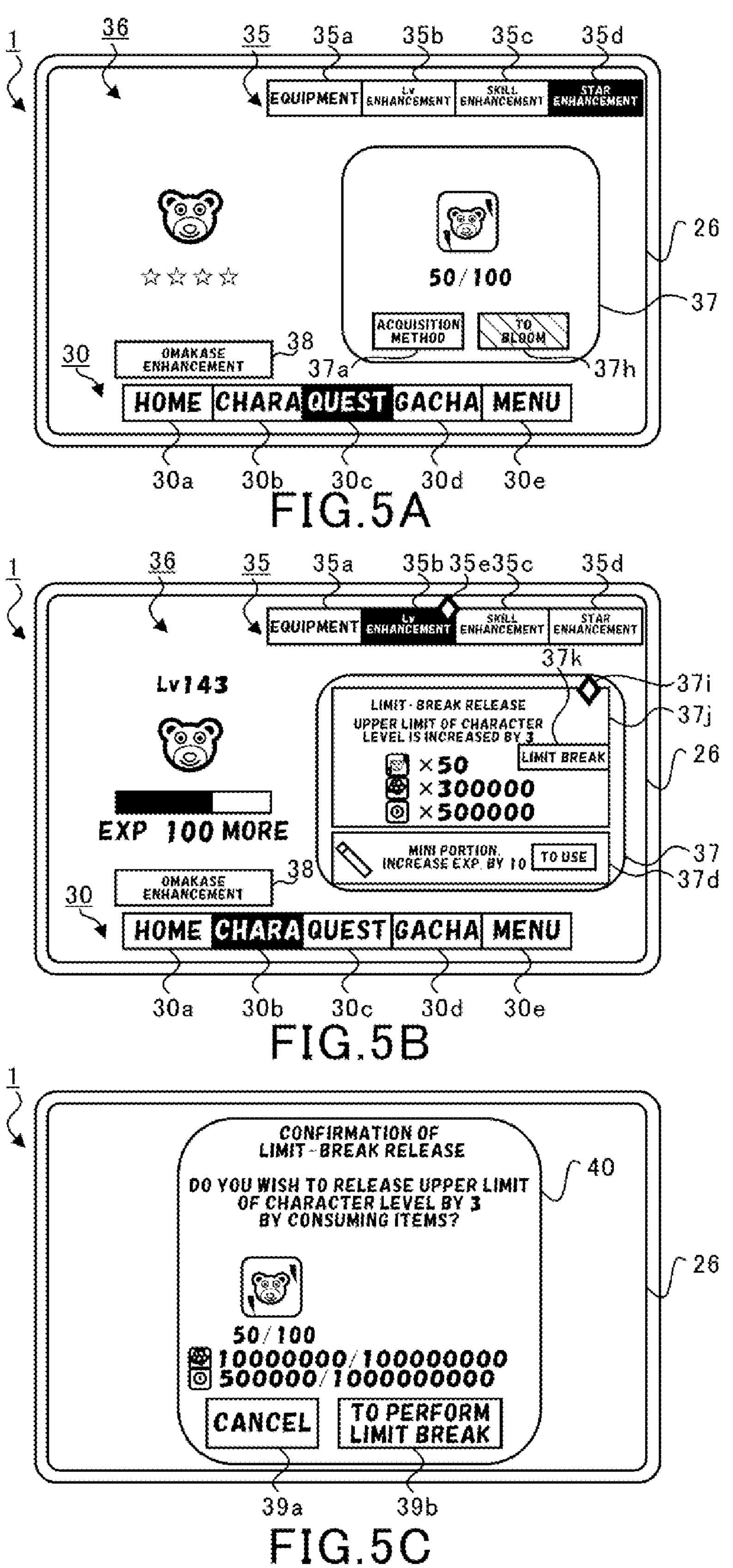
FIG. 5A is a fifth view for explaining an example of the ally-character detail screen.
FIG. 5B is a sixth view for explaining an example of the ally-character detail screen.
FIG. 5C is a view for explaining an example of an upper-limit break pop-up.

FIG. 3A is a view for explaining an example of a home screen. FIG. 3B is a view for explaining an example of an ally-character confirmation screen. FIG. 3C is a first view for explaining an example of an ally-character detail screen. FIG. 4A is a second view for explaining an example of the ally-character detail screen. FIG. 4B is a third view for explaining an example of the ally-character detail screen. FIG. 4C is a fourth view for explaining an example of the ally-character detail screen. FIG. 5A is a fifth view for explaining an example of the ally-character detail screen. FIG. 5B is a sixth view for explaining an example of the ally-character detail screen. FIG. 5C is a view for explaining an example of a limit-break pop-up. Game screens are displayed on the display 26 of the player terminal 1. In this embodiment, the game screens are roughly divided into normal screens and a battle screen.

The normal screens are screens mainly used when the player performs various settings and confirmation of information. On the other hand, the battle screen is a screen displayed on the display 26 from the start to the end of a battle game. Here, all screens except the battle screen are the normal screens. As the normal screens, a plurality of screens are provided, such as the home screen, which is shown in FIG. 3A, the ally-character confirmation screen, which is shown in FIG. 3B, a quest screen (see FIG. 7A), a shop screen (not shown), a guild screen (not shown), a gacha screen (not shown), and a menu screen (not shown).

In the normal screens, a menu bar 30 is displayed in a lower section of the display 26, as shown in FIG. 3A, for example. In the menu bar 30, a plurality of operation sections that can be operated (tapped) by the player are provided. In the menu bar 30, a home-screen selection operation section 30*a*, in which “home” is written, an ally-character confirmation-screen selection operation section 30*b*, in which “character” is written, a quest-screen selection operation section 30*c*, in which “quest” is written, a gacha-screen selection operation section 30*d*, in which “gacha” is written, and a menu-screen selection operation section 30*e*, in which “menu” is written, are provided.

When the home-screen selection operation section 30*a* is tapped, the home screen, which is shown in FIG. 3A, is displayed on the display 26. Furthermore, when the ally-character confirmation-screen selection operation section 30*b* is tapped, the ally-character confirmation screen, which is shown in FIG. 3B, is displayed on the display 26. Similarly, when the quest-screen selection operation section 30*c* is tapped, the quest screen, which is shown in FIG. 6A, is displayed on the display 26. Furthermore, when the gacha-screen selection operation section 30*d* is tapped, the gacha screen is displayed on the display 26. Furthermore, when the menu-screen selection operation section 30*e* is tapped, the menu screen is displayed on the display 26. Note that, although a detailed description will be omitted, it is possible to perform, in the menu screen, game settings and confirmation of various kinds of information.

In order to be able to identify the screen currently displayed on the display 26, the operation section corresponding to the screen is displayed in a highlighted manner in the menu bar 30.

The home screen, which is shown in FIG. 3A, corresponds to an initial screen, and a header display area 31 is provided at an upper section. In the header display area 31, level information 31*a* indicating the player level (predetermined information) associated with the player ID, a stamina display bar 31*b* indicating the stamina of the player associated with the player ID, and the possessed amounts of a first currency and a second currency associated with the player ID are displayed.

Note that the stamina is a parameter needed to play battle games. In this embodiment, a plurality of kinds of battle games are provided, and a stamina consumption value needed for playing, the number of challenges per day, etc., are set for each of the battle games. In the case where a battle game for which the stamina consumption value needed for playing has been set is played, the player consumes the corresponding stamina to play the battle game. Thus, if the stamina is insufficient, the player cannot play the battle game.

Although a detailed description will be omitted, when the player clears a battle game, the player can obtain a predetermined number of points as player experience points. Then, every time the player experience points reach a fixed value, the player level is raised. A management upper limit is set for the player level, and, even when player experience points are obtained, the player level is not raised beyond the set management upper limit. Note that the management upper limit is set by an administrator and is increased at a predetermined timing. For example, the management upper limit is manually updated by the administrator at a regular update that is performed once a month or the like. However, the update of the management upper limit is not limited thereto, and, for example, the management upper limit may also be updated mechanically and automatically by a program at a regular update that is performed once a month or the like. In this program, the update time and the update content are set in advance.

Furthermore, an upper limit of the stamina is set for the player level, and the upper limit of the stamina is increased as the player level is raised. The stamina is restored by a predetermined number of points (for example, 1 point) every fixed period of time (for example, five minutes) within the range defined by the upper limit. The current remaining amount of the stamina with respect to the upper limit of the stamina is displayed at the stamina display bar 31*b*, so as to be visually ascertainable.

The first currency and the second currency are currencies available only in the games. For example, when a battle game is cleared, it is possible to obtain a predetermined amount of the first currency depending on the cleared battle game. The second currency can be obtained for free or for a fee. Note that, although the first currency and the second currency can be obtained by various methods, a detailed description thereof will be omitted.

Furthermore, a notification selection operation section 32 may be displayed at a right end of the home screen. Although a detailed description will be omitted, in the case where, for example, a guild battle that is one of the battle games is being held, the notification selection operation section 32 in which "guild battle" is written is displayed.

A home menu 33 is displayed between the menu bar 30 and the notification selection operation section 32 in the home screen. In the home menu 33, a shop-screen selection operation section 33*a*, in which "shop" is written, a guild-screen selection operation section 33*b*, in which "guild" is written, a notification-screen selection operation section 33*c*, in which "notification" is written, and a present-screen selection operation section 33*d*, in which "present" is written, are provided.

When the shop-screen selection operation section 33*a* is tapped, a shop screen (not shown) on which items are available to be purchased is displayed. Furthermore, when the guild-screen selection operation section 33*b* is tapped, a guild screen (not shown) is displayed on the display 26. Furthermore, when the notification-screen selection operation section 33*c* is tapped, a notification screen (not shown) for displaying update information, maintenance information, etc., is displayed on the display 26. Furthermore, when the present-screen selection operation section 33*d* is tapped, a present screen (not shown) for displaying an item distributed by the administrator, for example, is displayed on the display 26.

In the ally-character confirmation screen, which is shown in FIG. 3B, images of ally characters corresponding to ally-character IDs associated with the player ID are all displayed. That is, all ally characters owned by the player are displayed in the ally-character confirmation screen. Note that the ally-character IDs are used to identify the ally characters, and different IDs are assigned to the individual ally characters. Then, when the player obtains a new ally character, for example, by a gacha lottery etc., the ally-character ID of the obtained ally character is associated with the player ID of the player.

A party-screen selection operation section 34, in which "party" is written, is displayed at the right end of the ally-character confirmation screen. When the party-screen selection operation section 34 is tapped, a party organizing screen (not shown) is displayed on the display 26, and it is possible to organize and store a party that is organized by up to five ally characters.

Various parameters, such as the number of stars (rarity), experience points, a character level, a skill level, and an equipment rank, are stored for each ally character. The experience points are increased in the case where a battle game, to be described later, is won, or in the case where a predetermined item is used. The character level is set in accordance with the experience points and is raised each time the experience points reach a predetermined value. Note that, for the character level, the player level is set as a progression upper limit. Therefore, the character level can be raised up to the player level.

Furthermore, base values of battle abilities, such as life points, attacking power, and xdefensing power, are set for each ally character on the basis of the number of stars (rarity) and the character level. The player can proceed with a battle game more advantageously as the battle abilities of each ally character become higher. Furthermore, the individual base values set for each ally character are raised as the number of stars (rarity) thereof is increased or as the character level thereof becomes higher.

Furthermore, four skills to be executed (activated) in a battle game are set for each ally character. The skill level is set for each of the skills, and the effect of each skill is increased as the skill level becomes higher. Note that, for the skill level, the character level is set as a progression upper limit. Therefore, the skill level can be raised up to the character level.

Furthermore, each ally character can be equipped with equipment such as a weapon and protective gear. For each item of equipment, the character level at which the item of equipment can be equipped is set, and additional values for the attacking power, the defensing power, etc., are set. By raising the character level of an ally character, the ally character can be equipped with a newer and stronger item of equipment and can be further enhanced. When the ally characters are equipped with items of equipment, the additional values of the individual items of equipment are added to the above-mentioned base values, thus making it possible to enhance the battle abilities of the ally characters.

Specifically, when the image of any of the ally characters displayed in the ally-character confirmation screen, which is shown in FIG. 3B, is tapped, the ally-character detail screen corresponding to the tapped ally character is displayed on the display 26, as shown in FIG. 3C. In the ally-character detail screen, an enhancement-item selection operation section 35, an enhancement-item display area 36, an enhancement-detail display area 37, and an auto-enhancement operation section 38 are provided.

In the enhancement-item selection operation section 35, a plurality of operation sections that can be operated (tapped) by the player are provided. In the enhancement-item selection operation section 35, an equipment selection operation section 35*a*, an Lv-enhancement selection operation section 35*b*, a skill-enhancement selection operation section 35*c*, and a star-enhancement selection operation section 35*d* are provided. In the enhancement-item selection operation section 35, either one of the operation sections is selected, and the selected operation section is highlighted.

In the enhancement-item display area 36, an enhancement item(s) corresponding to the selected operation section in the enhancement-item selection operation section 35 is displayed.

When the equipment selection operation section 35*a* in the enhancement-item selection operation section 35 is tapped, six items of equipment are displayed around the image of the ally character in the enhancement-item display area 36. Here, among the six items of equipment, items of equipment with which the ally character is not equipped are displayed in gray, as indicated by hatching in the figure, and items of equipment with which the ally character is equipped are displayed in color.

Furthermore, among the items of equipment with which the ally character is not equipped (among the upper right item of equipment and the lower right item of equipment in the figure), a mark indicated by "+" is displayed for an item of equipment that has already been owned (including an item of equipment that can be created), as in the upper right item of equipment in the figure. On the other hand, "available" is displayed for an item of equipment that has not been owned (including an item of equipment that cannot be created), as in the lower right item of equipment in the figure. Note that, as in the upper left item of equipment in the figure, an item of equipment that has not yet been implemented in games is indicated by "?".

Furthermore, an equipment rank (in the figure, RANK 15) indicating the rank of items of equipment to be equipped is set for each ally character. The equipment rank can be raised when (six) items of equipment at one rank lower are all equipped. In the case where rank-up is possible, a rank-up operation section 39 is enabled. When the rank-up operation section 39 is tapped, the equipment rank is raised by 1, and items of equipment at the raised equipment rank are displayed in the enhancement-item display area 36.

Furthermore, when any of the items of equipment in the enhancement-item display area 36 is tapped, the status of the operated item of equipment is displayed in the enhancement-detail display area 37. Furthermore, an acquisition-method operation section 37*a* for displaying how to get the item of equipment and an equipment operation section 37*b* for allowing the ally character to be equipped with the item of equipment are displayed in the enhancement-detail display area 37. Although a detailed description will be omitted, when the acquisition-method operation section 37*a* is tapped, an acquisition method for the item of equipment is displayed on the display 26. Furthermore, when the equipment operation section 37*b* is tapped if the item of equipment is owned, the ally character is equipped with the item of equipment.

Then, when the ally character is equipped with the item of equipment, an enhancement operation section 37*c* is displayed, instead of the equipment operation section 37*b*, in the enhancement-detail display area 37, as shown in FIG. 4A. Here, an item of equipment can be enhanced up to 5 stages. Although a detailed description will be omitted, when the enhancement operation section 37*c* is tapped, a screen for selecting an item for enhancing the item of equipment is displayed. When the item is selected in the screen, and a decision operation section (not shown) is tapped, the item of equipment is enhanced by consuming the selected item.

When the Lv-enhancement selection operation section 35*b* in the enhancement-item selection operation section 35 is tapped, the character level and the experience points required to raise the character level by one are displayed around the image of the ally character, in the enhancement-item display area 36, as shown in FIG. 4B.

Furthermore, a plurality of item display sections 37*d* for increasing the experience points are displayed in the enhancement-detail display area 37. In each of the item display sections 37*d*, the name of an item, a description of the item, and a use operation section 37*e* for using the item are displayed. When the use operation section 37*e* is tapped, the experience points of the ally character are increased by the experience points corresponding to the item. Note that, in the case where the player does not own the item displayed in the item display section 37*d*, the use operation section 37*e* for that item does not accept an operation from the player.

When the skill-enhancement selection operation section 35*c* in the enhancement-item selection operation section 35 is tapped, the image of the ally character is displayed in the enhancement-item display area 36, as shown in FIG. 4C. Furthermore, a plurality of skill display sections 37*f* are displayed in the enhancement-detail display area 37. In each of the skill display sections 37*f*, the name of a skill, the skill level, and an enhancement operation section 37*g* for raising the skill level are displayed. When the enhancement operation section 37*g* is tapped, the first currency corresponding to the skill level is consumed, and the skill level is raised by one. Note that, in the case where the player does not own the first currency corresponding to the skill level, and, in the case where the skill level has reached the character level, the enhancement operation section 37*g* does not accept an operation from the player.

When the star-enhancement selection operation section 35*d* in the enhancement-item selection operation section 35 is tapped, the image of the ally character and the number of stars (rarity) of the ally character are displayed in the enhancement-item display area 36, as shown in FIG. 5A. Furthermore, in the enhancement-detail display area 37, an item required for increasing the number of stars is displayed, and the number of items owned by the player with respect to the number of items (required number) required for increasing the number of stars, for example, 50/100, is displayed.

Furthermore, the acquisition-method operation section 37*a* for displaying how to get the item and a blooming operation section 37*h* for increasing the number of stars are provided in the enhancement-detail display area 37. In the case where the acquisition-method operation section 37*a* is operated, an acquisition method for the item is displayed on the display 26. Furthermore, when the number of items owned by the player meets the required number, and the blooming operation section 37*h* is tapped, the number of stars of the ally character is increased by one. Note that, in the case where the number of items for increasing the number of stars does not meet the required number, the blooming operation section 37*h* is displayed in gray, as indicated by hatching in FIG. 5A, so as not to accept an operation from the player.

Note that, in the case where the auto-enhancement operation section 38 in the ally-character detail screen is tapped, the character level, the skill level, and the equipment rank of the ally character are raised as much as possible.

As described above, the player level of the player is not raised to a value that is greater than the management upper limit set by the administrator. Furthermore, for the character level, the player level is basically set as the progression upper limit. Furthermore, for the skill level, the character level is set as the progression upper limit. Specifically, in the case where the management upper limit is set to "150", "150" is set as the progression upper limit for the player level, the character level, and the skill level. Note that, regarding the experience points, the experience points may be accumulated, for example, within the range from "150" to "151", "150" inclusive and "151" exclusive, in the player level and the character level.

In this embodiment, when a particular character (game medium) satisfies a special condition set in advance, the progression upper limit (hereinafter, simply referred to as upper limit) of the character level thereof can be increased to a value higher than the player level. Note that, in the case where the upper limit of the character level thereof is increased to the value higher than the player level, the progression upper limit (hereinafter, simply referred to as upper limit) of the skill level thereof is also increased to a value higher than the player level, in the same way as the character level. Hereinafter, increasing the upper limit of the character level to a value higher than the player level is also referred to as limit break.

In this embodiment, limit break can be performed on a particular character over a plurality of stages. Note that, limit break can be performed on an ally character when the number of stars (rarity) of the ally character is a certain number or more. For example, limit break can be performed on an ally character when the ally character has five stars or more. Furthermore, in the case where the ally-character detail screen of an ally character on which limit break can be performed is first displayed on the display 26, a limit-break tutorial occurs.

FIG. 6 is a view showing list information for explaining a special condition for a particular character. The list information is stored in the server 100 and can be obtained at the player terminal 1 by being downloaded from the server 100. As shown in FIG. 6, the list information contains character ID information, limit-break stage information, break-possible Lv information, and required-item information.

The character ID information is information indicating an ally-character ID, and information about a plurality of ally-character IDs is contained in one piece of list information. For facilitating the explanation, FIG. 6 shows only one ally-character ID (00001) among the plurality of ally-character IDs. Note that the list information is not limited thereto, and the list information may also be provided for each ally-character ID. That is, it is also possible to provide a plurality of pieces of list information corresponding to the number of kinds of ally characters that can be owned by the player. The limit-break stage information is information indicating a limit-break stage (the number limit breaks) of the ally character. The break-possible Lv information is information indicating an increase value (predetermined value) of the upper limit of the character level with respect to the player level when limit break is performed on the ally character. The required-item information is information indicating the kinds (item IDs) of and the number of material items required when limit break is performed on the ally character.

In the list information shown in FIG. 6, it is set that the number of items 1, the number of items 2, and the number of items 3 required to perform first-stage limit break on the ally character of the character ID "00001" are "300000", "500000", and "50", respectively. Furthermore, it is set that the upper limit of the character level is increased by "+3", with respect to the player level, when the first-stage limit break is performed on the ally character.

Furthermore, in the list information, it is set that the number of items 1, the number of items 2, and the number of items 3 required to perform second-stage limit break on the ally character of the character ID "00001" are "500000", "1000000", and "100", respectively. Furthermore, it is set that the upper limit of the character level is increased by "+5", with respect to the player level, when the second-stage limit break is performed on the ally character.

In this way, the amount of an increase in the upper limit of the character level with respect to the player level is increased as the limit-break stage becomes larger. Furthermore, the numbers of required items are increased as the limit-break stage becomes larger. It is also possible that the kinds of required items are not uniformly set among the individual character IDs, and the item IDs that change depending on the character IDs are included. The player information includes information indicating the management upper limit of the player level, information indicating the current player level, information indicating the current limit-break stage (the number of times of limit break) for each ally character, information indicating the current character level for each ally character, and information indicating the current skill level for each ally character. Note that the information indicating the management upper limit of the player level may also be stored in the server 100 as reference information common to all players, separately from the player information.

Note that, in FIG. 6, the character ID information, the limit-break stage information, the break-possible Lv information, and the required-item information of a new character, for example, may be manually added to the list information at a predetermined timing for update. However, this disclosure is not limited thereto, and the program may be made such that the character ID information, the limit-break stage information, the break-possible Lv information, and the required-item information of a new character are automatically added to the list information periodically for update. Furthermore, in FIG. 6, although the number of kinds of items required to perform limit break is set to three, this disclosure is not limited thereto. For example, the number of kinds of items required to perform limit break may also be one, two, or four or more. Furthermore, the number of kinds of required items may be increased as the limit-break stage becomes larger.

Furthermore, in FIG. 6, an example case has been described, in which an increase value of the upper limit of the character level with respect to the current player level is shown as the break-possible Lv information. However, this disclosure is not limited thereto, and a value obtained by adding the increase value to the current player level may be shown as the break-possible Lv information.

Furthermore, the list information may contain permission information. The permission information is information set for each ally-character ID and indicating whether limit break can be performed on the ally character. For example, the permission information is set to "ON" or "OFF". Limit break is permitted for an ally-character ID for which "ON" has been set. Limit break is not permitted for an ally-character ID for which "OFF" has been set.

Note that a function release condition may also be set in accordance with the limit-break stage. For example, the player level or a main quest ID may be set for each limit-break stage. In the case where the player does not satisfy the function release condition, it is also possible that limit break cannot be performed in the limit-break stage at which the player does not satisfy the function release condition, even if the player owns the kinds of and the number of required items.

In the case where a particular character satisfies the special condition, limit-break possible marks 35*e* and 37*i* are displayed in the Lv-enhancement selection operation section 35*b* and the enhancement-detail display area 37, as shown in FIG. 5B. The limit-break possible marks 35*e* and 37*i* are used to notify the user that limit break can be performed on the ally character displayed in the enhancement-item display area 36. Note that, this disclosure is not limited thereto, and, for example, a new dedicated tab “limit-break selection operation section” may be provided in the enhancement-item selection operation section 35, instead of the limit-break possible mark 35*e*.

Furthermore, in the enhancement-detail display area 37, a limit-break release display section 37*j* is displayed above the item display section 37*d*. In the limit-break release display section 37*j*, an explanation of how high the upper limit of the character level can be increased through limit break, the kinds of and the number of items required for limit break, and a limit-break selection operation section 37*k* are displayed. Note that, in the limit-break release display section 37*j*, the limit-break stage (the number of times of limit break) may also be displayed so as to be able to confirm the current limit-break status.

When the limit-break selection operation section 37*k* is operated, a limit-break pop-up 40 shown in FIG. 5C is displayed on the display 26. In the limit-break pop-up 40, the kinds of and the number of items required for limit break, a confirmation sentence about whether to release the upper limit of the character level by consuming those items, a cancel operation section 39*a*, and a limit-break decision operation section 39*b* are displayed. Note that, after limit break, it is impossible to return to the state before the limit break. That is, the upper limit of the character level increased through limit break cannot be decreased. Thus, it is also possible to display, in the limit-break pop-up 40, an attention message indicating that, after limit break is performed, it is impossible to return to the state before the limit break.

When the cancel operation section 39*a* is operated, the limit-break pop-up 40 is closed to return to the ally-character detail screen that is shown in FIG. 5B. When the limit-break decision operation section 39*b* is operated, processing for subtracting the consumed required items from the items owned by the player, processing for releasing the upper limit of the character level through the limit break, and rendering processing for performing the limit break are executed.

After the limit break, in the case where limit break in the next stage is possible (permitted), the screen is returned to the ally-character detail screen that is shown in FIG. 5B, and, in the case where limit break in the next stage is impossible (not permitted), the screen is returned to the ally-character detail screen that is shown in FIG. 4B. Note that, regarding an ally character on which limit break has been performed, the display color of the character level may be changed in order to easily distinguish it from an ally character (s) on which limit break has not been performed. For example, the display color of the character level of an ally character on which limit break has been performed may be changed to a color different from the display color of an ally character (s) on which limit break has not been performed.

Here, a description will be given of the relationships among the management upper limit set by the administrator, the current player level, and the upper limit of the character level of each ally character, in the case where limit break is not performed. In one example, in the case where the management upper limit is “200”, and the current player level is “190”, the upper limit of the character level is set to “190”, which is the same value as the current player level. Furthermore, in the case where the management upper limit is “200”, and the current player level is “200”, the upper limit of the character level is set to “200”, which is the same value as the management upper limit and the current player level.

Next, a description will be given of the relationships among the management upper limit, the current player level, the upper limit (hereinafter, referred to as special upper limit) of the character level of a particular character after limit break, and the upper limit of the character level of each of the characters other than the particular character (hereinafter, referred to as the other characters), in the case where limit break is performed. In one example, in the case where the management upper limit is “200”, the current player level is “200”, and the limit-break stage is the first stage “+3”, the special upper limit is set to “203” obtained by adding “+3” to the current player level “200”. On the other hand, the upper limit of the character level of each of the other characters is set to “200”, which is the same value as the management upper limit and the current player level.

Here, in the case where the management upper limit is updated, and the updated management upper limit becomes “205”, and the current player level remains “200”, the special upper limit is set to “203” obtained by adding “+3” to the current player level “200”. On the other hand, the upper limit of the character level of each of the other characters is set to “200”, which is the same value as the current player level. Thereafter, in the case where the management upper limit is not updated and remains “205”, the player level of the player is increased, and the current player level becomes “205”, the special upper limit is set to “208” obtained by adding “+3” to the current player level “205”. On the other hand, the upper limit of the character level of each of the other characters is set to “205”, which is the same value as the management upper limit and the current player level. Note that the consumption amount of the cost required to change the character level (parameter) is constant irrespective of the particular character or the other characters. Furthermore, the consumption amount of the cost required to change the parameter is constant irrespective of whether limit break has been performed or not.

As described above, in this embodiment, in the case where the special condition for a particular character (game medium) is satisfied, limit break processing for setting a special value that exceeds the upper limit of the character level (parameter) as the special upper limit of the character level of the particular character is performed. Through the limit break processing, the upper limit of the character level is increased by a predetermined value, with respect to the current player level. In other words, in the case where the special condition is satisfied, in the limit break processing, the upper limit of the character level of the particular character can be set to a value that exceeds a reference value corresponding to the player level (predetermined information) at that point, by a predetermined value. Then, since the predetermined value is held in the list information, by referring to the list information when the player level is changed, the special upper limit of the character level of the particular character can be changed in accordance with the change in the player level. That is, in the limit break processing, in the case where the player level is updated with the special condition being satisfied, the upper limit of the character level of the particular character can be set to a value that exceeds the reference value corresponding to the updated player level by the predetermined value.

Consequently, the player level is raised after the limit break processing, and, even when the upper limit of the character level is accordingly increased to the same value as the special upper limit of the particular character at the time of limit break, the special upper limit of the particular character after the player level is raised becomes a value that exceeds the raised player level by a predetermined value. In this embodiment, even in the case where the player level is updated after limit break processing, the special upper limit obtained by adding the same value as the above-described predetermined value to the updated player level (the upper limit of the character level) is set, whereby a sense of loss by the player does not occur.

Figure 7A:
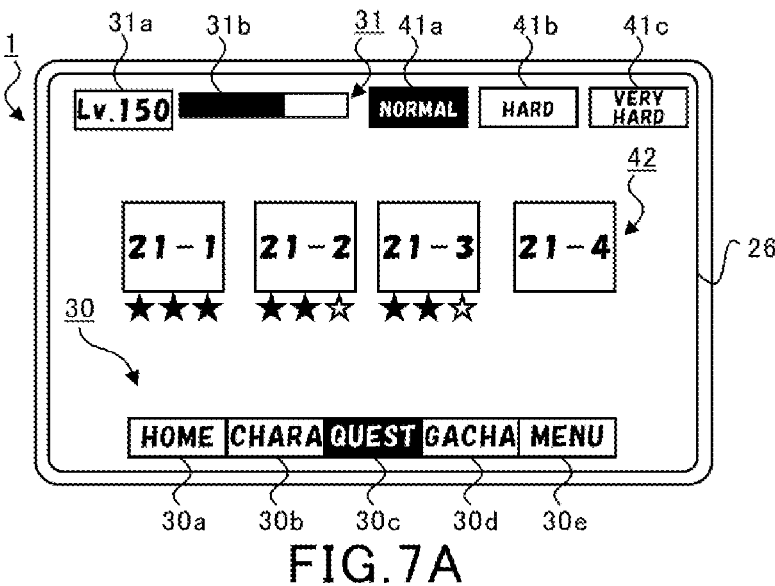
FIG. 7A is a view for explaining an example of a quest screen for a normal quest.
Figure 7B:
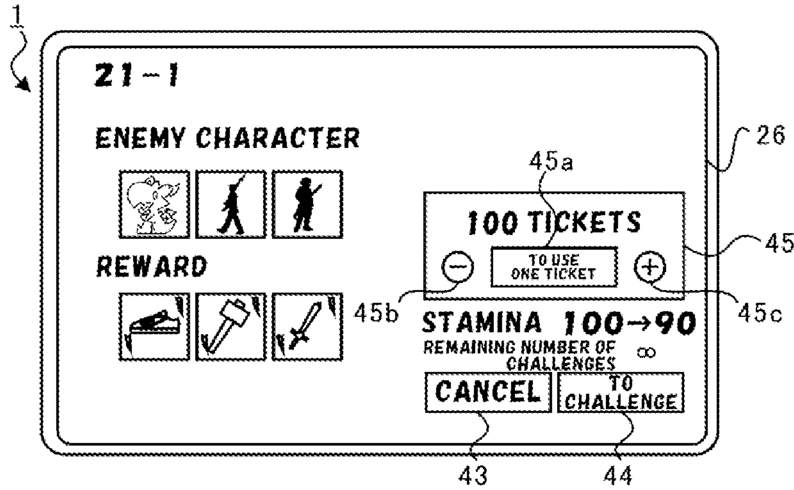
FIG. 7B is a view for explaining an example of a quest selection screen for the normal quest.
Figure 7C:
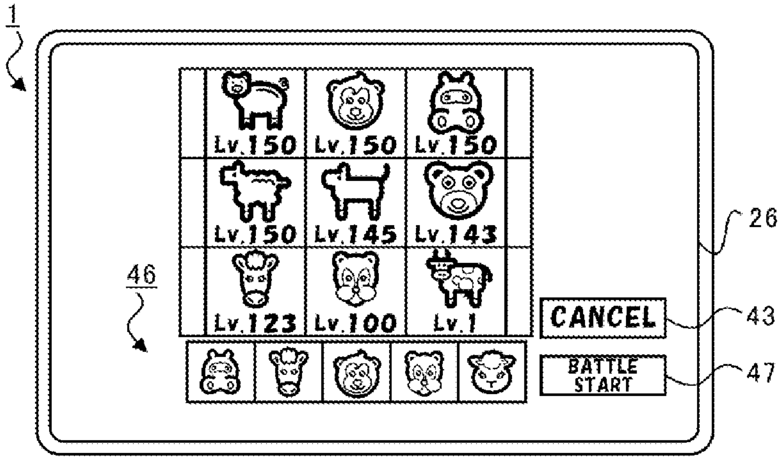
FIG. 7C is a view for explaining an example of a party selection screen.

FIG. 7A is a view for explaining an example of a quest screen for a normal quest. FIG. 7B is a view for explaining an example of a quest selection screen for the normal quest. FIG. 7C is a view for explaining an example of a party selection screen.

When the quest-screen selection operation section 30*c* is tapped in the home screen, which is shown in FIG. 3A, the quest screen, which is shown in FIG. 7A, is displayed on the display 26. Note that, in this embodiment, although a description will be given of an example case in which there are three classifications, i.e., a normal quest, a hard quest, and a very hard quest, to which battle games belong, battle games belonging to another classification (guild battle or the like) may also be provided.

Note that an opening condition may be set depending on the classification of battle games. The opening condition can be, for example, a condition that the player level is equal to or greater than a predetermined value, a condition that another predetermined battle game is cleared, etc. Furthermore, a plurality of battle games (hierarchy) belong to each battle-game classification. The opening condition is also set for each of these battle games. Then, when the opening condition is satisfied, game opening information included in the player information is updated.

In the quest screen, a normal-quest selection operation section 41*a* for selecting the normal quest, a hard-quest selection operation section 41*b* for selecting the hard quest, and a very-hard-quest selection operation section 41*c* for selecting the very hard quest are provided. In the quest screen, either the normal-quest selection operation section 41*a*, the hard-quest selection operation section 41*b*, or the very-hard-quest selection operation section 41*c* is always selected, and the normal-quest selection operation section 41*a* is selected in the initial state. Although an example case in which the normal-quest selection operation section 41*a* is selected will be described below, the same applies to the case in which the hard-quest selection operation section 41*b* or the very-hard-quest selection operation section 41*c* is selected.

In the case where the normal-quest selection operation section 41*a* is selected, a quest operation section 42 for selecting any one of a plurality of battle games (hierarchy) that belong to the normal quest is displayed in the quest screen.

In the quest operation section 42, clear information for each of the battle games is also displayed. The clear information is indicated by three stars, for example. In a battle game, if the battle game is cleared, the corresponding number of stars is obtained in accordance with the number of ally characters whose life points become 0 when the battle game is cleared. For example, three stars are obtained in the case where there is no ally character whose life points become 0. Two stars are obtained in the case where there is one ally character whose life points become 0. One star is obtained in the case where there are two or more ally characters whose life points become 0.

In the example shown in FIG. 7A, three stars have been obtained in a battle game “21-1”, two stars have been obtained in a battle game “21-2”, and two stars have been obtained in a battle game “21-3”. Furthermore, no star is obtained in a battle game “21-4”, which indicates that this battle game has not been cleared.

Note that an opening condition that the previous battle game is cleared is set in the quests (the normal quest, the hard quest, and the very hard quest). For example, in the example shown in FIG. 7A, the battle games up to “21-3” have been cleared, so that the battle game “21-4” is opened, but battle games thereafter (a battle game “21-5” and the subsequent battle games, not shown) are unopened.

When the quest operation section 42 for the battle game “21-1”, for example, is operated (tapped) in the quest screen, the quest selection screen shown in FIG. 7B is displayed on the display 26. In the quest selection screen, enemy characters that appear in the battle game and items (rewards) that can be obtained from the battle game are displayed. Furthermore, the stamina before and after execution of the battle game and the remaining number of challenges are displayed in the quest selection screen. Note that the remaining number of challenges indicates the number of challengeable times in a day and is set to be infinite for battle games of the normal quest. Furthermore, in this embodiment, the stamina to be consumed in a battle game of the normal quest is set to 10. However, the stamina to be consumed in a battle game of the normal quest may also be different for each battle game.

Furthermore, in the quest selection screen, a cancel operation section 43 and a challenge operation section 44, in which “to challenge” is written, for challenging the battle game are displayed.

When the cancel operation section 43 is operated (tapped), the quest screen, which is shown in FIG. 7A, is displayed on the display 26, and challenge to the selected battle game “21-1” is cancelled.

On the other hand, when the challenge operation section 44 is operated (tapped), the party selection screen, which is shown in FIG. 7C, is displayed on the display 26. In the party selection screen, all ally characters owned by the player are displayed, and a selected-ally-character display area 46 for displaying selected ally characters is displayed below.

Furthermore, the cancel operation section 43 and a battle-start operation section 47, in which “battle start” is written, are displayed in the party selection screen.

When the player operates (taps) some of the ally characters displayed in the party selection screen, the operated ally characters are displayed in the selected-ally-character display area 46. That is, here, from among the plurality of ally character IDs associated with the player ID, ally character IDs to be used in the battle game (for determining a party) are selected.

Then, when the ally characters (the ally character IDs) are selected, and the battle-start operation section 47 is operated (tapped), the battle game is started.

Figure 8A:
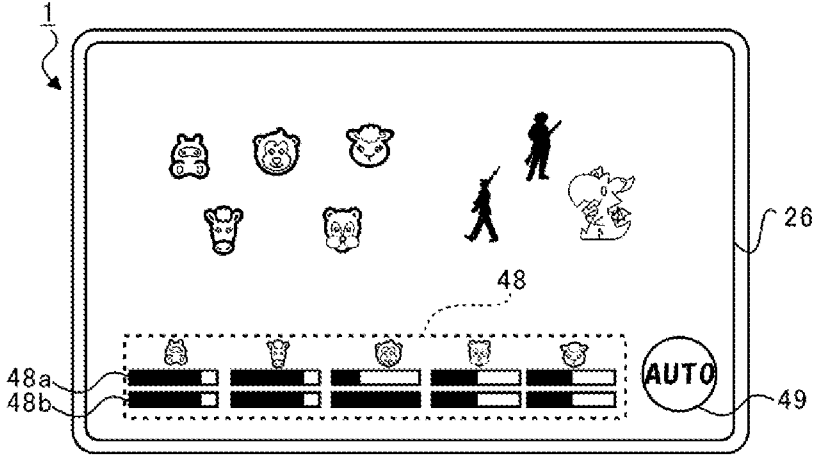
FIG. 8A is a view for explaining an example of a battle screen.
Figure 8B:
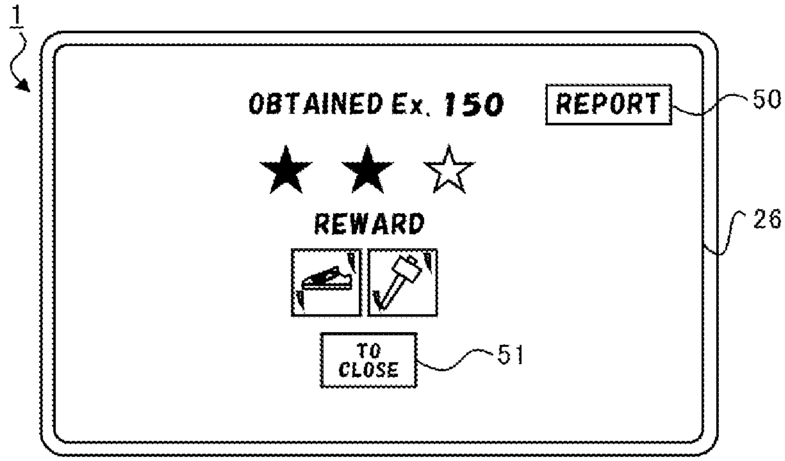
FIG. 8B is a view for explaining an example of a result screen.
Figure 8C:
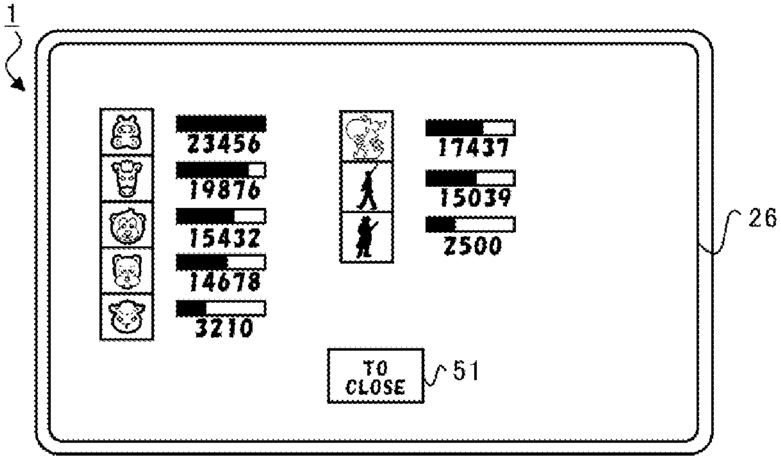
FIG. 8C is a view for explaining an example of a report screen.

FIG. 8A is a view for explaining an example of a battle screen. FIG. 8B is a view for explaining an example of a result screen. FIG. 8C is a view for explaining an example of a report screen. When the battle-start operation section 47 is operated (tapped) in the party selection screen, which is shown in FIG. 7C, the battle game is started.

During the battle game, the battle screen is displayed as shown in FIG. 8A. In the battle screen, the ally characters and the enemy characters are displayed on the display 26. The ally characters act under computer control, cause damage to the enemy characters, and receive damage from the enemy characters. Furthermore, the enemy characters act under computer control, cause damage to the ally characters, and receive damage from the ally characters.

When damage points are assigned to any of the enemy characters, the damage points are subtracted from the life points of the enemy character. Similarly, when damage points are assigned to any of the ally characters, the damage points are subtracted from the life points of the ally character. The player wins (clears) the battle game when the life points of all the enemy characters become 0, and the player loses the battle game when the life points of all the ally characters become 0 (lose).

Here, as shown in FIG. 8A, an ally-character display area 48 is provided in a lower section of the battle screen. In the ally-character display area 48, life points 48*a* and a skill gauge 48*b* for each of the ally characters are displayed. The skill gauge 48*b* is raised when the ally character receives damage from any of the enemy characters or causes damage to any of the enemy characters. Then, when the skill gauge 48*b* reaches a predetermined maximum value, the ally character becomes able to use the skill. With the skill, damage points assigned to any of the enemy characters are greater than with a normal attack, the life points of the ally character are restored, and a special effect is assigned to any of the enemy characters.

Here, two methods to use the skill are provided. In one method, the player operates (taps) an ally character that is displayed in the ally-character display area 48 and of which the skill gauge 48*b* reaches the maximum value. In another method, when the skill gauge 48*b* reaches the maximum value in an automatic state, the corresponding ally character uses the skill under computer control. Note that an automatic selection operation section 49 is displayed in the battle screen, and it is possible to switch between the automatic state and a manual state in response to an operation performed on the automatic selection operation section 49. When the automatic selection operation section 49 is operated in the manual state, the automatic state, in which the skill is automatically used, is selected. Furthermore, when the automatic selection operation section 49 is operated in the automatic state, the manual state, in which the skill is manually used, is selected. Note that, even in the automatic state, in a state in which the skill gauge 48*b* has reached the maximum value and in which the skill has not been used under computer control, when the player operates (taps) the corresponding ally character, the skill can be used.

Then, when the battle game ends normally (normal end), a result screen is displayed on the display 26, as shown in FIG. 8B. FIG. 8B shows an example of the result screen displayed when the battle game is cleared.

In the result screen, at least part of game result information for the battle game is displayed, and a report display operation section 50, in which "report" is written, and an end operation section 51, in which "to close" is written, are displayed.

Note that the game result information includes the ally character IDs (party) of the ally characters, the enemy character IDs of the enemy characters, the remaining states of the ally characters and the enemy characters when the battle ends (whether their life points become 0 when the battle game ends), the damage points given (total value), whether the manual state or the automatic state is selected, the battle log ID, the classification (the normal quest, the hard quest, or the very hard quest) of the battle game, information associated with each battle-game classification (clear information, hierarchy of the battle game, etc.), assigned-item information, the assigned first currency, etc. Furthermore, the battle log ID is uniquely assigned to each battle game. Furthermore, information associated with each battle-game classification has content different for each battle-game classification. Furthermore, in the case where the battle game is cleared, the server 100 determines by lottery, for each item preset for the cleared battle game, whether to assign the item to the player. Then, an item(s) to be assigned to the player is assigned to the game result information and is displayed in the result screen.

When the end operation section 51 is operated (tapped) in the result screen, the display on the display 26 is switched from the battle screen to a normal screen. That is, the result screen is part of the battle screen. Note that the normal screen switched from the result screen may be the screen that was displayed immediately before switching to the battle screen or may be a predetermined screen, such as the home screen. In this way, the battle game ends at the end of display of the result screen.

When the report display operation section 50 is operated (tapped) in the result screen, the report screen, which is shown in FIG. 8C, is displayed on the display 26. In the report screen, the damage points (total values) given by the ally characters and the enemy characters are displayed, and the end operation section 51 is displayed.

When the end operation section 51 is operated (tapped), the result screen, which is shown in FIG. 8B, is displayed on the display 26.

Furthermore, in the quest selection screen, which is shown in FIG. 7B, a ticket display area 45 is provided. In the ticket display area 45, the number of tickets owned by the player (the number of tickets associated with the player ID) is displayed, and a ticket-use challenge operation section 45*a*, a minus operation section 45*b*, and a plus operation section 45*c* are provided. The ticket-use challenge operation section 45*a*, the minus operation section 45*b*, and the plus operation section 45*c* are enabled only for a battle game from which three stars have been obtained as the clear information and are disabled for a battle game from which three stars have not been obtained as the clear information.

In the case where the ticket-use challenge operation section 45*a*, the minus operation section 45*b*, and the plus operation section 45*c* are enabled, every time the plus operation section 45*c* is operated (tapped), the text written in the ticket-use challenge operation section 45*a* is changed such that the number of tickets to be used is incremented by one, as in "to use two tickets" and "to use three tickets". Furthermore, every time the minus operation section 45*b* is operated (tapped), the text written in the ticket-use challenge operation section 45*a* is changed such that the number of tickets to be used is decremented by one, as in "to use two tickets" and "to use one ticket".

Then, for example, in the case where the text written in the ticket-use challenge operation section 45*a* indicates "to use five tickets", when the ticket-use challenge operation section 45*a* is operated (tapped), five tickets and a stamina of 50 are consumed, and formation of a party in the party selection screen, which is shown in FIG. 7C, and execution of the battle game in the battle screen, which is shown in FIG. 8A, are omitted (skipped). In this case, the battle game is treated as being cleared all (five) rounds, and a result screen such as that shown in FIG. 8B is displayed. In this result screen, items obtained from five rounds of the battle game are collectively displayed.

In this way, the battle game from which three stars have been obtained as the clear information is omitted by consuming a ticket (s), whereby the battle game is treated as being cleared. Accordingly, the player can collect items while saving time.

Next, basic configurations and communication processing of the player terminal 1 and the server 100 will be described below. Note that an example of basic communication processing for proceeding with a game and an example of main communication processing related to free raising of the parameter will be described here, and a description of the other processing will be omitted.

(Functional Configuration of Player Terminal 1)

Figure 9:
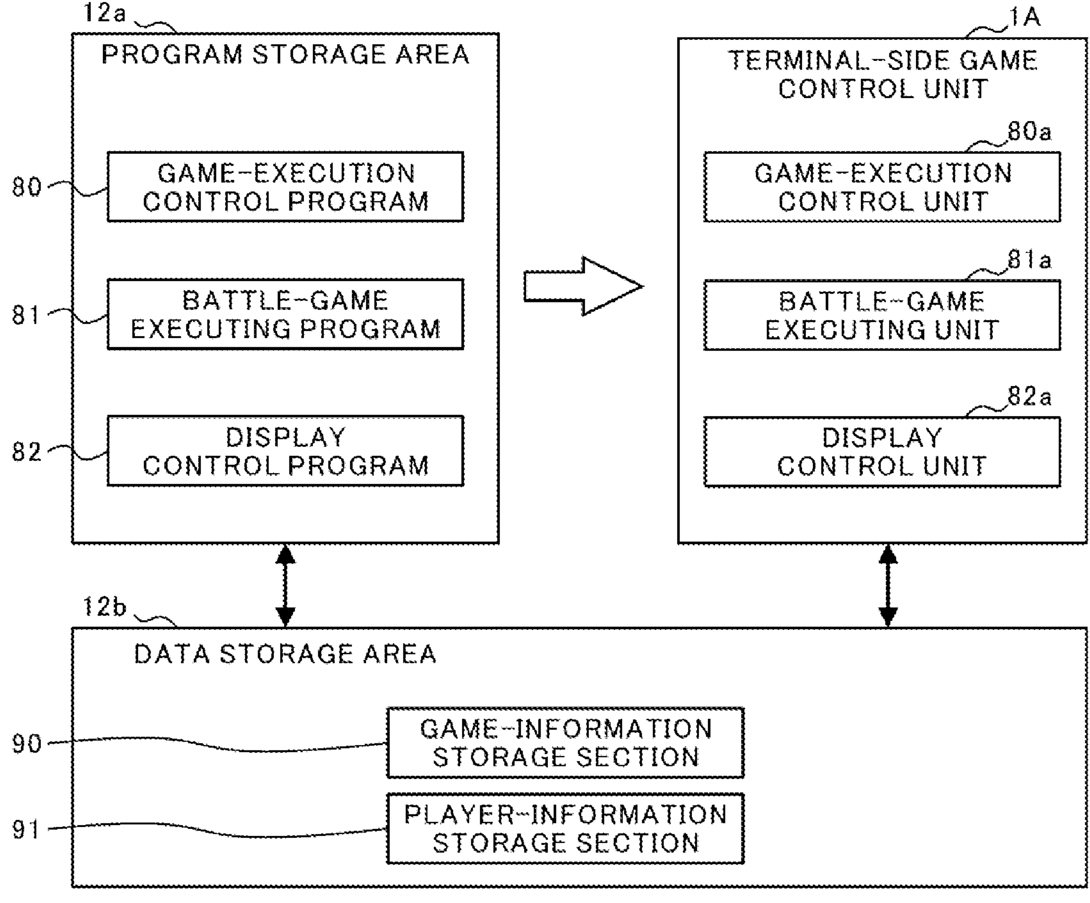
FIG. 9 is a diagram for explaining the configuration of a memory at the player terminal and the function of the player terminal serving as a computer.

FIG. 9 is a diagram for explaining the configuration of the memory 12 at the player terminal 1 and the function of the player terminal 1 serving as a computer. In the memory 12, a program storage area 12*a* and a data storage area 12*b* are provided. When a game is started, the CPU 10 stores terminal-side game control programs (modules) in the program storage area 12*a*.

The terminal-side game control programs include a game-execution control program 80, a battle-game executing program 81, and a display control program 82. Note that the programs listed in FIG. 9 are merely examples, and a large number of other programs are also provided as the terminal-side game control programs.

In the data storage area 12*b*, a game-information storage section 90 and a player-information storage section 91 are provided as storage sections for storing data. Note that the above-mentioned storage sections are merely examples, and a large number of other storage sections are also provided in the data storage area 12*b*.

The CPU 10 runs the individual programs stored in the program storage area 12*a* and updates data in the individual storage sections of the data storage area 12*b*. Then, the CPU 10 runs the individual programs stored in the program storage area 12*a*, thereby causing the player terminal 1 (computer) to function as a terminal-side game control unit 1A. The terminal-side game control unit 1A includes a game-execution control unit 80*a*, a battle-game executing unit 81*a*, and a display control unit 82*a*.

Specifically, the CPU 10 runs the game-execution control program 80, thereby causing the computer to function as the game-execution control unit 80*a*. Similarly, the CPU 10 runs the battle-game executing program 81 and the display control program 82, thereby causing the computer to function as the battle-game executing unit 81*a* and the display control unit 82*a*, respectively.

The game-execution control unit 80*a* controls the proceeding of the entire game. The game-execution control unit 80*a* sends login information to the server 100 at the time of logging in, for example. Furthermore, the game-execution control unit 80*a* performs control related to transition of the normal screens. Furthermore, in the case where game information about the whole game is updated, the game-execution control unit 80*a* receives the game information from the server 100 and stores the game information in the game-information storage section 90.

The battle-game executing unit 81*a* takes charge of control of the execution of battle games. For example, the battle-game executing unit 81*a* updates the battle screen, controls actions of ally characters and enemy characters, and derives damage points, on the basis of operations input to the player terminal 1.

The display control unit 82*a* generates a screen to be displayed on the display 26 and makes the generated screen displayed on the display 26.

(Functional Configuration of Server 100)

Figure 10:
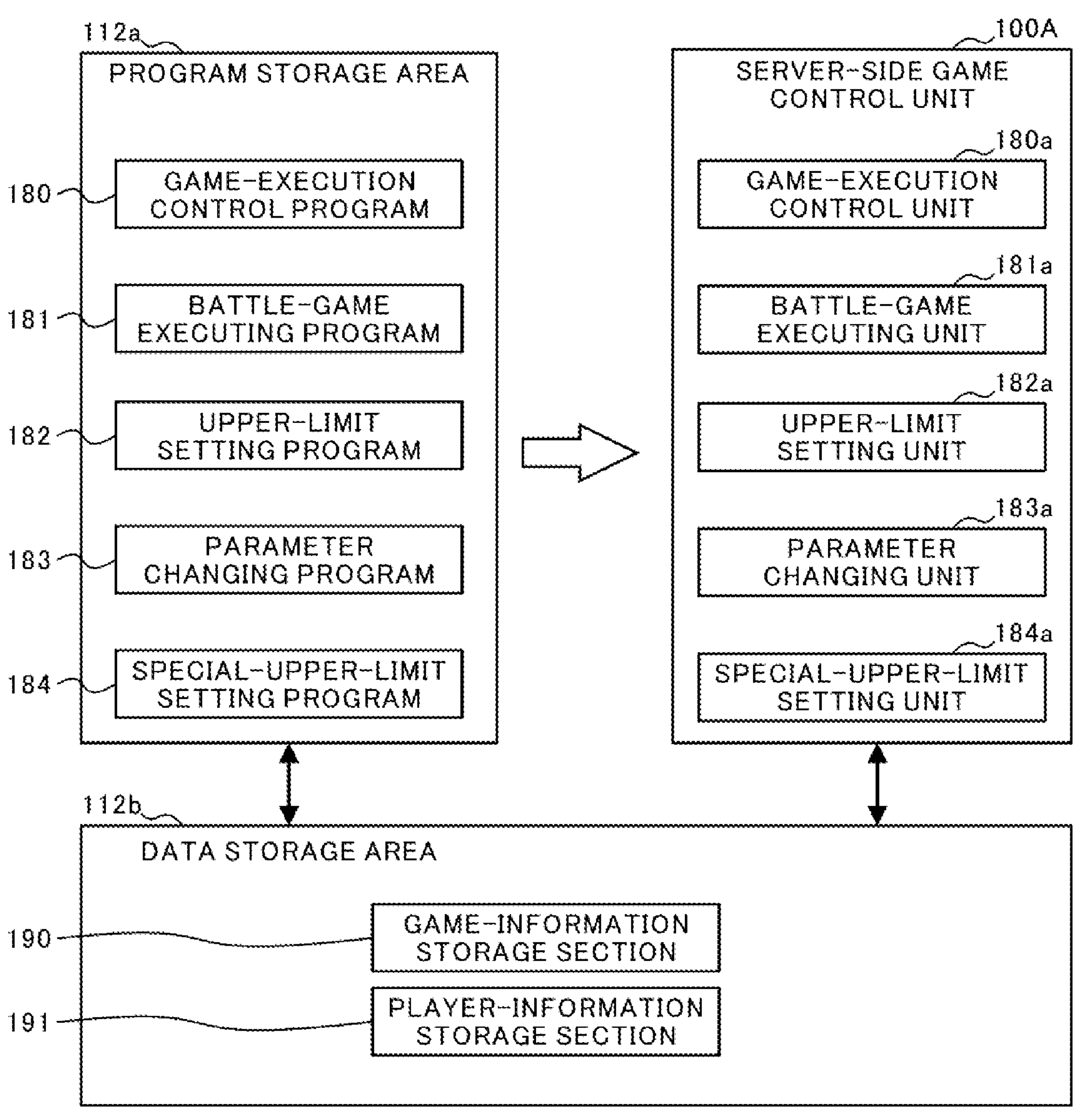
FIG. 10 is a diagram for explaining the configuration of a memory at the server and the function of the server serving as a computer.

FIG. 10 is a diagram for explaining the configuration of the memory 112 at the server 100 and the function of the server 100 serving as a computer. In the memory 112, a program storage area 112*a* and a data storage area 112*b* are provided. When a game is started, the CPU 110 stores server-side game control programs (modules) in the program storage area 112*a*.

The server-side game control programs include a game-execution control program 180, a battle-game executing program 181, an upper-limit setting program 182, a parameter changing program 183, and a special-upper-limit setting program 184. Note that the programs listed in FIG. 10 are merely examples, and a large number of other programs are also provided as the server-side game control programs.

In the data storage area 112*b*, a game-information storage section 190 and a player-information storage section 191 are provided as storage sections for storing data. Note that the above-mentioned storage sections are merely examples, and a large number of other storage sections are also provided in the data storage area 112*b*.

The CPU 110 runs the individual programs stored in the program storage area 112*a* and updates data in the individual storage sections of the data storage area 112*b*. Then, the CPU 110 runs the individual programs stored in the program storage area 112*a*, thereby causing the server 100 to function as a server-side game control unit 100A. The server-side game control unit 100A includes a game-execution control unit 180*a*, a battle-game executing unit 181*a*, an upper-limit setting unit 182*a*, a parameter changing unit 183*a*, and a special-upper-limit setting unit 184*a*.

Specifically, the CPU 110 runs the game-execution control program 180, thereby causing the computer to function as the game-execution control unit 180*a*. Similarly, the CPU 110 runs the battle-game executing program 181, the upper-limit setting program 182, the parameter changing program 183, and the special-upper-limit setting program 184, thereby causing the computer to function as the battle-game executing unit 181*a*, the upper-limit setting unit 182*a*, the parameter changing unit 183*a*, and the special-upper-limit setting unit 184*a*, respectively.

The game-execution control unit 180*a* controls the proceeding of the entire game. When login information, for example, is received from the player terminal 1, the game-execution control unit 180*a* enables the player terminal 1 to download the player information stored in the player-information storage section 191 from the server 100. Furthermore, the game-execution control unit 180*a* executes processing for updating the management upper limit of the player level and processing for updating the player level (predetermined information) in accordance with the game status of the player. Furthermore, in the case where the game information about the whole game is updated, the game-execution control unit 180*a* reads the updated game information from the game-information storage section 190 and enables the player terminal 1 to download the updated game information from the server 100.

The battle-game executing unit 181*a* takes charge of control of the execution of battle games.

The upper-limit setting unit 182*a* executes processing for setting the upper limit of the parameter of each ally character on the basis of the player level, which changes in accordance with the game status of the player. For example, the upper-limit setting unit 182*a* sets the upper limit of the character level (skill level) to the reference value corresponding to the player level. In this embodiment, the reference value is the same value as the value of the player level. However, the present invention is not limited thereto, and the reference value may be a value that is different from the value of the player level, for example, a value that is smaller than the value of the player level by a predetermined value. Here, in the case where the player level is updated, the upper-limit setting unit 182*a* can set the upper limit of the character level of each ally character to the reference value corresponding to the updated player level. Furthermore, in the case where the player level is updated with the special condition set in advance being not satisfied, the upper-limit setting unit 182*a* can set the upper limit of the character level of a particular character to the reference value corresponding to the updated player level.

The parameter changing unit 183*a* executes processing for changing the parameter of each ally character, by using, as an upper limit, the upper limit set by the upper-limit setting unit 182*a* or the special upper limit set by the special-upper-limit setting unit 184*a*, to be described later. Furthermore, the parameter changing unit 183*a* executes processing for consuming the cost, in accordance with the change of the parameter of the ally character. In the case where an operation for changing (raising) the parameter is performed in the ally-character detail screen, the parameter changing unit 183*a* changes (raises) the parameter in response to the operation. Note that the consumption amount of the cost required to change the parameter is constant irrespective of whether the special condition is satisfied or not. Furthermore, the consumption amount of the cost required to change the parameter is constant irrespective of whether limit break has been performed or not. Note that the consumption amount of the cost required to change the parameter may be different depending on whether the special condition is satisfied or not or whether limit break has been performed or not.

In the case where the special condition for a particular character is satisfied, the special-upper-limit setting unit 184*a* executes processing for setting a special value that exceeds the upper limit set by the upper-limit setting unit 182*a*, as the special upper limit of the parameter of the particular game medium. In other words, in the case where the special condition for a particular character is satisfied, the special-upper-limit setting unit 184*a* can set the upper limit of the character level of the particular character to a value that exceeds the reference value corresponding to the player level at that point, by a predetermined value. For example, in the case where the current player level is "150", and the limit-break stage is the first stage "+3", the special-upper-limit setting unit 184*a* refers to the list information, which is shown in FIG. 6, and derives and sets, as the special upper limit, a value of "153", which is obtained by adding "+3" to "150". In this way, in the case where the special condition for a particular character is satisfied, the special-upper-limit setting unit 184*a* can execute the limit break processing. Furthermore, in the case where the player level is updated with the special condition being satisfied, the special-upper-limit setting unit 184*a* can set the upper limit of the character level of the particular character to a value that exceeds the reference value corresponding to the updated player level by a predetermined value.

(Communication Processing Between Player Terminal 1 and Server 100)

Figure 11:
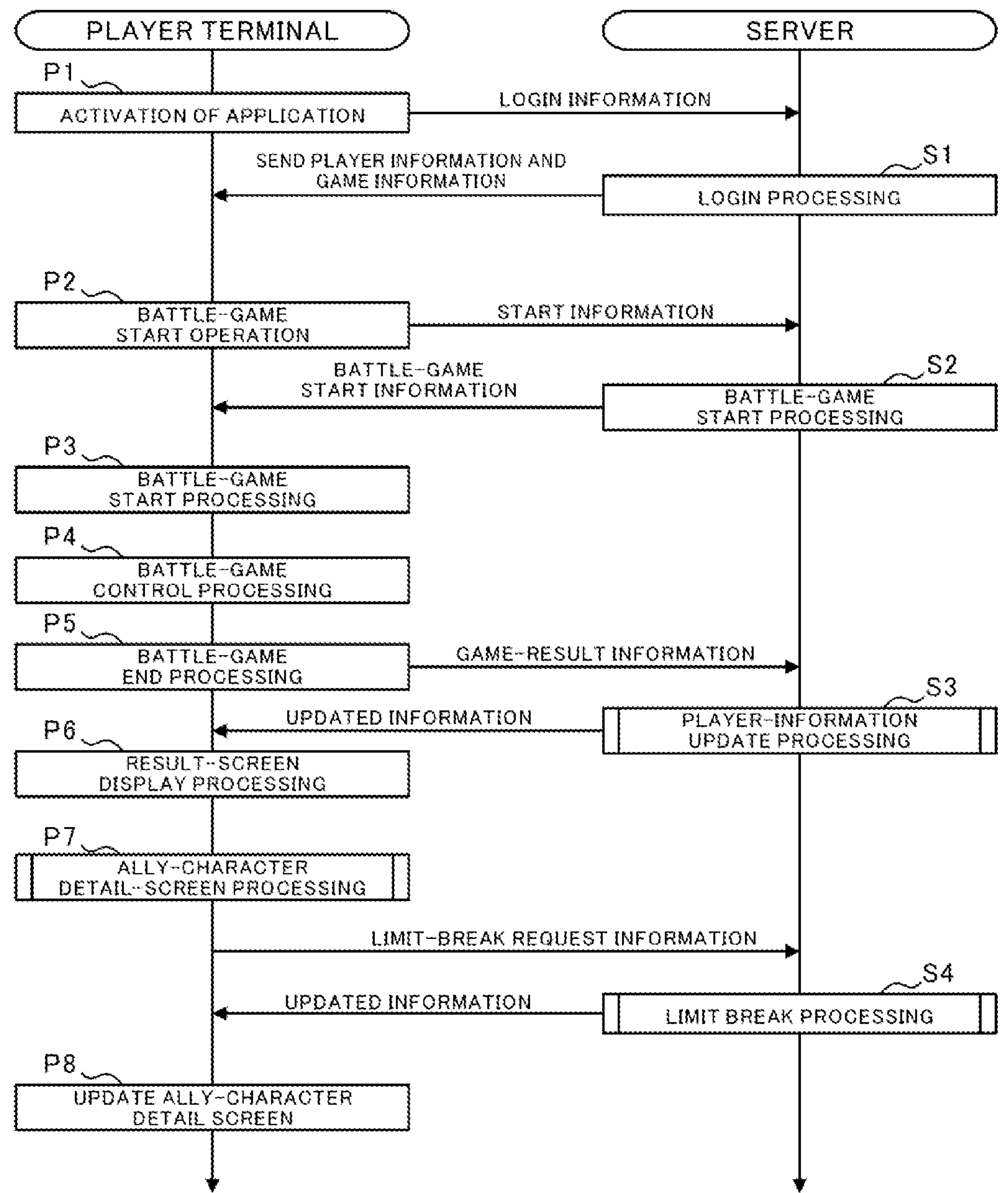
FIG. 11 is a sequence diagram for explaining basic processing at the player terminal and the server.

FIG. 11 is a sequence diagram for explaining basic processing at the player terminal 1 and the server 100. Note that, in the following description, processing at the player terminal 1 is indicated by Pn (n is an arbitrary integer). Furthermore, processing at the server 100 is indicated by Sn (n is an arbitrary integer).

At the player terminal 1, when the player activates a game application (P1), the game-execution control unit 80*a* sends login information to the server 100. When the login information is received, the game-execution control unit 180*a* of the server 100 identifies the player ID associated with the login information to perform login processing (S1). Here, the game-execution control unit 180*a* reads the player information corresponding to the identified player ID and the list information, which is shown in FIG. 6, from the player-information storage section 191 and enables the player terminal 1 to download the player information and the list information from the server 100. Furthermore, in the case where the game information stored in the game-information storage section 190 is changed, the game-execution control unit 180*a* enables the player terminal 1 to download the changed game information from the server 100. Note that the game information includes the list information, which is shown in FIG. 6.

It is assumed that a start operation for a battle game is performed at the player terminal 1 (P2). In this case, start information is sent from the player terminal 1 to the server 100. Note that the start information includes party information, battle-game classification information, etc., selected by the player. Upon reception of the start information, the server 100 enables the player terminal 1 to download, from the server 100, battle-game start information required to start the battle game (S2). Then, when the battle-game start information is received, the battle-game executing unit 81*a* of the player terminal 1 performs battle-game start processing for starting the battle game (P3). Here, for example, an area of the memory 12 for proceeding with the battle game is allocated, and a predetermined program is loaded from the storage unit 18 into the memory 12.

After that, the battle-game executing unit 81*a* of the player terminal 1 performs battle-game control processing for controlling the battle game (P4). In the battle-game control processing, update processing for updating various kinds of information is repeatedly executed on a per-frame basis. Note that the number of frames is not particularly limited; for example, the number of frames per second is 30 to 60. Thus, during the battle game, information is updated at intervals of about 16 milliseconds (ms) to 33 ms at the player terminal 1.

Then, when an end condition for the battle game is established, the battle-game executing unit 81*a* of the player terminal 1 performs battle-game end processing for ending the battle game (P5). In the battle-game end processing, for example, game result information is sent to the server 100. Furthermore, the display control unit 82*a* of the player terminal 1 displays a result screen on the display 26 (P6).

When the game result information is obtained, the battle-game executing unit 181*a* of the server 100 updates the player information (S3).

Figure 12:
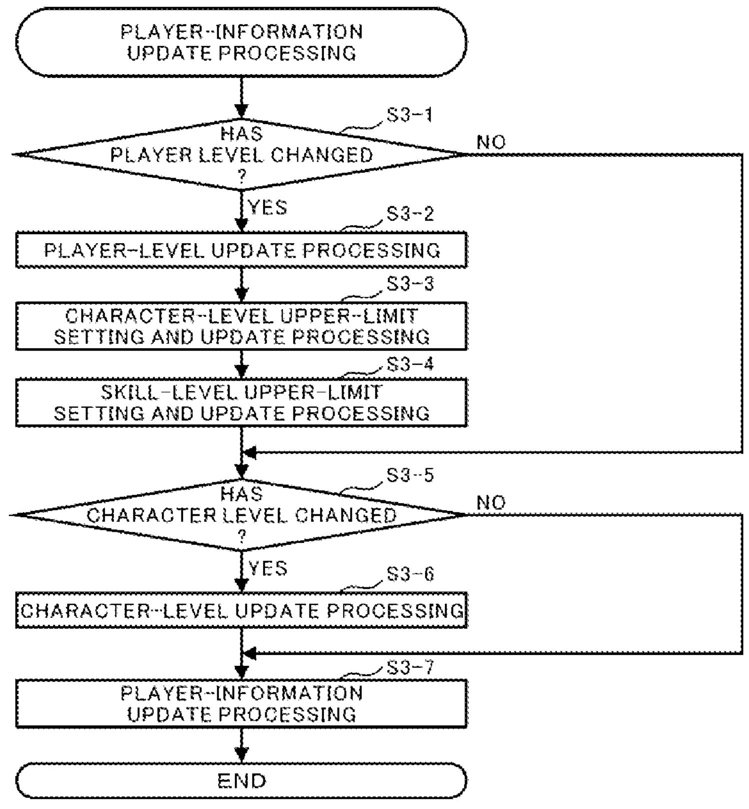
FIG. 12 is a flowchart for explaining an example of player-information update processing.

FIG. 12 is a flowchart for explaining an example of player-information update processing. As shown in FIG. 12, the game-execution control unit 180*a* determines whether the player level has changed, from the game result information (S3-1). For example, the game-execution control unit 180*a* determines whether the player level has been raised, by the experience points obtained when the player clears the battle game.

In the case where the player level has changed (YES in S3-1), the game-execution control unit 180*a* executes processing for updating the player level (S3-2). Furthermore, the upper-limit setting unit 182*a* executes processing for setting and updating the upper limit of the character level to the value of the updated player level (S3-3). Similarly, the upper-limit setting unit 182*a* executes processing for setting and updating the upper limit of the skill level of each ally character to the updated upper limit of the character level (S3-4).

The parameter changing unit 183*a* determines whether the character level has changed, from the game result information (S3-5). For example, the parameter changing unit 183*a* determines whether the character level has been raised by the experience points obtained when the player clears the battle game. In the case where the character level has changed (YES in S3-5), the parameter changing unit 183*a* executes processing for updating the character level of each ally character (S3-6).

Then, the game-execution control unit 180*a* executes processing for updating the player information on the basis of information related to the player level updated in S3-2, information related to the upper limit of the character level updated in S3-3, information related to the upper limit of the skill level updated in S3-4, information related to the character level updated in S3-6, and reward information assigned to the player in accordance with the game result information (S3-7).

Returning to FIG. 11, when the image of an ally character is tapped in the ally-character confirmation screen, the game-execution control unit 80*a* of the player terminal 1 executes ally-character detail-screen processing (P7).

Figure 13:
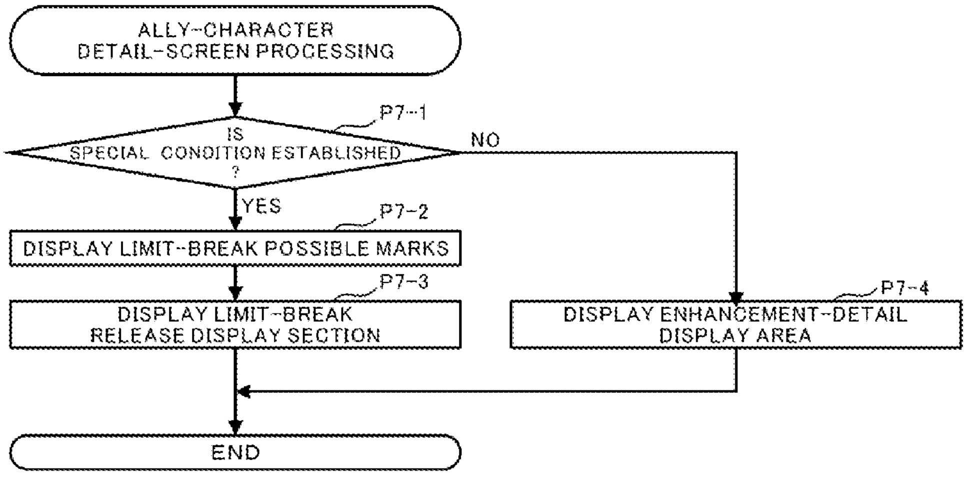
FIG. 13 is a flowchart for explaining an example of ally-character detail-screen processing.

FIG. 13 is a flowchart for explaining an example of the ally-character detail-screen processing. As shown in FIG. 13, the game-execution control unit 80*a* determines whether the particular character satisfies the special condition, on the basis of the list information, which is shown in FIG. 6, and the player information (P7-1). For example, the game-execution control unit 80*a* determines that the special condition is established, when the character ID of the particular character is included in the list information, the number of stars of the particular character is five or more, and the player owns the number of items required for the limit-break stage. Furthermore, the game-execution control unit 80*a* derives an upper limit (special upper limit) of the character level of the ally character on which limit break has been performed, on the basis of the current player level and the current limit-break stage.

In the case where the particular character satisfies the special condition (YES in P7-1), the display control unit 82*a* makes the limit-break possible marks 35*e* and 37*i* displayed in the Lv-enhancement selection operation section 35*b* and the enhancement-detail display area 37, as shown in FIG. 5B (P7-2). Furthermore, the display control unit 82*a* makes the limit-break release display section 37*j* displayed in the enhancement-detail display area 37 (P7-3). Furthermore, in the case where limit break has been performed on the particular character, the display control unit 82*a* performs processing for changing the display color of the character level thereof.

On the other hand, in the case where the particular character does not satisfy the special condition (NO in P7-1), the display control unit 82*a* makes the enhancement-detail display area 37 that is shown in FIG. 4B, displayed in the ally-character detail screen (P7-4).

Returning to FIG. 11, when the limit-break decision operation section 39*b* is operated in the limit-break pop-up 40, the game-execution control unit 80*a* sends limit-break request information to the server 100. When the limit-break request information is received, the game-execution control unit 180*a* of the server 100 executes the limit break processing (S4).

Figure 14:
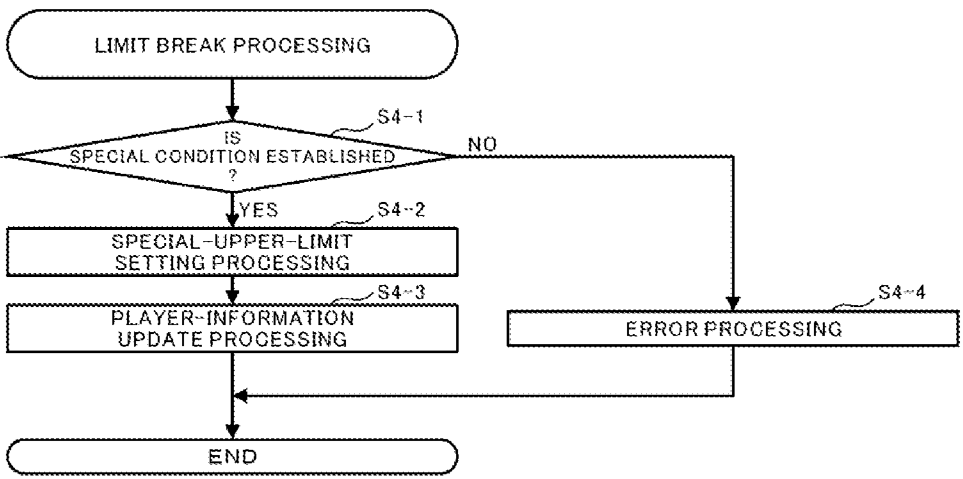
FIG. 14 is a flowchart for explaining an example of limit break processing.

FIG. 14 is a flowchart for explaining an example of the limit break processing. As shown in FIG. 14, the game-execution control unit 180*a* determines whether the particular character satisfies the special condition on the basis of the list information, which is shown in FIG. 6, and the player information (S4-1). Since this determination processing is the same as the above-described processing in P7-1, a detailed description thereof will be omitted.

In the case where the special condition is satisfied (YES in S4-1), the special-upper-limit setting unit 184*a* executes special-upper-limit setting processing for increasing the upper limit of the character level of the particular character to a value higher than the player level (S4-2). Specifically, the special-upper-limit setting unit 184*a* derives the upper limit of the character level of the ally character on which limit break has been performed, on the basis of information indicating the current player level and information indicating the current limit-break stage (the number of times of limit break), which is set for each ally character. For example, in the case where the current player level is "150", and the limit-break stage is the "1-st" stage, the special-upper-limit setting unit 184*a* refers to the list information, which is shown in FIG. 6, and derives a value "153" by adding "+3" that is break-possible Lv information for the "1-st" stage, which is the current limit-break stage (the number of times of limit break), to the current player level "150", which serves as the upper limit of the character level of the ally character on which limit break has been performed. In this way, the special-upper-limit setting unit 184*a* performs processing for adding, to the current player level, the value described in the break-possible Lv information set for the limit-break stage, shown in FIG. 6. That is, the special-upper-limit setting unit 184*a* refers to information indicating the current player level held in the player information and information indicating the current limit-break stage, which is set for each ally character, and extracts (selects) break-possible Lv information corresponding to the current limit-break stage, from the list information, which is shown in FIG. 6. Then, the special-upper-limit setting unit 184*a* performs processing for deriving the special upper limit by adding "+3" (predetermined value) that is the extracted break-possible Lv information to the current player level "150".

Then, the special-upper-limit setting unit 184*a* executes processing for updating the player information in accordance with the special upper limit derived in S4-2 (S4-3). Furthermore, the special-upper-limit setting unit 184*a* enables the player terminal 1 to download the updated player information from the server 100.

On the other hand, in the case where the special condition is not satisfied (NO in S4-1), the special-upper-limit setting unit 184*a* executes error processing, generates error information indicating that the special-upper-limit setting processing cannot be performed, and enables the player terminal 1 to download the error information from the server 100 (S4-4).

Returning to FIG. 11, when the updated player information is received, the display control unit 82*a* of the player terminal 1 updates and displays the ally-character detail screen on the basis of the updated player information (P8).

As described above, the player terminal 1 has the game-execution control program 80, the battle-game executing program 81, and the display control program 82 provided therein. Furthermore, the player terminal 1 includes the game-execution control unit 80*a*, the battle-game executing unit 81*a*, and the display control unit 82*a*. However, a portion or the entirety of these programs and functional units may be provided at the server 100. That is, these programs and functional units may be provided at one of or both of the player terminal 1 and the server 100.

Furthermore, the server 100 has the game-execution control program 180, the battle-game executing program 181, the upper-limit setting program 182, the parameter changing program 183, and the special-upper-limit setting program 184 provided therein. Furthermore, the server 100 includes the game-execution control unit 180*a*, the game-execution control unit 180*a*, the battle-game executing unit 181*a*, the upper-limit setting unit 182*a*, the parameter changing unit 183*a*, and the special-upper-limit setting unit 184*a*. However, a portion or the entirety of these programs and functional units may be provided at the player terminal 1. That is, these programs and functional units may be provided at one of or both of the player terminal 1 and the server 100.

Furthermore, the information processing program in the above-described embodiment may be stored in a computer-readable recording medium and provided in the form of the recording medium. Alternatively, the information processing program may be provided in the form of a player terminal or an information processing system that includes this recording medium. Furthermore, the above-described embodiment may be an information processing method for realizing the individual functions and the steps shown in the flowcharts.

Although an aspect of the embodiment has been described above with reference to the accompanying drawings, it goes without saying that the present invention is not limited to the embodiment described above. It would be obvious that a person skilled in the art could conceive of various modifications and amendments within the scope recited in the claims, and it will be understood that those modifications and amendments obviously belong to the technical scope of the present invention.

In the above-described embodiment, a description has been given of an example case in which the special upper limit of a particular character is derived at both of the player terminal 1 and the server 100. However, this disclosure is not limited thereto, it is also possible that derivation of the special upper limit of the particular character is not performed at the player terminal 1 and is performed only at the server 100. In that case, the player terminal 1 obtains, from the server 100, the special upper limit derived by the server 100, for example, at the time of log-in, at the time of transition to the ally-character detail screen, and at the time of change of the parameter of the ally character.

In the above-described embodiment, a description has been given of an example case in which processing for adding a predetermined value described in the break-possible Lv information set in accordance with the limit-break stage shown in FIG. 6 to the current player level (the upper limit of the character level) is performed to obtain the special upper limit of the particular character. However, the special upper limit just needs to be a value that exceeds the current player level, and, for example, may also be a value obtained by adding a value smaller than a predetermined value described in the break-possible Lv information set in accordance with the limit-break stage shown in FIG. 6, to the current player level. Furthermore, the special upper limit may also be a value obtained by adding a value greater than a predetermined value described in the break-possible Lv information set in accordance with the limit-break stage shown in FIG. 6, to the current player level. Accordingly, in the case where the player level is updated after the limit break processing, the special upper limit is set to a value that exceeds the changed player level, thereby reducing a player's sense of loss.

What is claimed is:

1. A non-transitory computer readable medium storing a program causing a computer to perform a method comprising:

obtaining, from a server over a communication network, a management upper limit for a player of a computer game, wherein the management upper limit sets a predetermined player level that cannot be exceeded by the player while operating the computer game;

displaying, on a display device within a player terminal, a game screen that presents a plurality of game characters for the computer game, wherein the game screen provides a user interface for selecting one or more game characters from among the plurality of game characters;

receiving, from an input unit within the player terminal, a first player input from the player for the computer game in response to displaying the game screen, wherein the first player input corresponds to a selection of a game character from among the plurality of game characters, and wherein the game character that is selected by the first player input corresponds to a character level in the computer game;

determining whether a special condition for the game character is satisfied within the computer game using list information, wherein the list information is obtained from the server over the communication network, wherein the list information comprises a character identifier (ID) associated with the game character, one or more required game items that are used for satisfying the special condition for the game character, and break-possible level information, and wherein the break-possible level information indicates a predetermined value that the character level of the game character increases beyond the predetermined player level in response to performing a limit break on the game character;

displaying, on the display device and in response to receiving the first player input, a character detail screen for the game character, wherein the character detail screen comprises a display area that comprises a tab for selecting the limit break for the game character, and wherein the tab is presented within the character detail screen in response to determining that the special condition is satisfied;

receiving, from the input unit within the player terminal, a second player input from the player for the computer game in response to displaying the tab within the character detail screen, wherein the second player input corresponds to a selection of the limit break for the game character;

displaying, on the display device within the player terminal and in response to receiving the second player input, a limit-break pop-up that comprises a cancel operation section, a limit-break decision operation section, and a message, wherein the message in the limit-break pop-up indicates the one or more required game items that are used to perform the limit break by the game character, wherein the cancel operation section causes the limit-break pop-up to close within the computer game, and wherein the limit-break decision operation section causes the limit break to be performed by the game character;

receiving, from the input unit within the player terminal, a third player input from the player for operating the limit-break decision operation section in the limit-break pop-up;

changing, in response to receiving the third player input for the limit-break decision operation section, the character level to produce a raised character level that exceeds the predetermined player level that is set by the server using the management upper limit; and executing, within the computer game, a battle game using a battle screen and the game character with the raised character level.

2. The non-transitory computer readable medium according to claim 1, wherein the method further comprises:

consuming a cost when the character level is changed, wherein a consumption amount of the cost required to change the character level is constant irrespective of whether the special condition is satisfied or not.

3. An information processing method comprising:

obtaining, by a player terminal from a server over a communication network, a management upper limit for a player of a computer game, wherein the management upper limit sets a predetermined player level that cannot be exceeded by the player while operating the computer game;

displaying, on a display device within the player terminal, a game screen that presents a plurality of game characters for the computer game, wherein the game screen provides a user interface for selecting one or more game characters from among the plurality of game characters;

receiving, from an input unit within the player terminal, a first player input from the player for the computer game in response to displaying the game screen, wherein the first player input corresponds to a selection of a game character from among the plurality of game characters, and wherein the game character that is selected by the first player input corresponds to a character level in the computer game;

determining, by the player terminal, whether a special condition for the game character is satisfied within the computer game using list information, wherein the list information is obtained from the server over the communication network, wherein the list information comprises a character identifier (ID) associated with the game character, one or more required game items that are used for satisfying the special condition for the game character, and break-possible level information, and wherein the break-possible level information indicates a predetermined value that the character level of the game character increases beyond the predetermined player level in response to performing a limit break on the game character;

displaying, on the display device and in response to receiving the first player input, a character detail screen for the game character, wherein the character detail screen comprises a display area that comprises a tab for selecting the limit break for the game character, and wherein the tab is presented within the character detail screen in response to determining that the special condition is satisfied;

receiving, from the input unit within the player terminal, a second player input from the player for the computer game in response to displaying the tab within the character detail screen, wherein the second player input corresponds to a selection of the limit break for the game character;

displaying, on the display device within the player terminal and in response to receiving the second player input, a limit-break pop-up that comprises a cancel operation section, a limit-break decision operation section, and a message, wherein the message in the limit-break pop-up indicates the one or more required game items that are used to perform the limit break by the game character, wherein the cancel operation section causes the limit-break pop-up to close within the computer game, and wherein the limit-break decision operation section causes the limit break to be performed by the game character;

receiving, from the input unit within the player terminal, a third player input from the player for operating the limit-break decision operation section in the limit-break pop-up;

changing, in response to receiving the third player input for the limit-break decision operation section, the character level to produce a raised character level that exceeds the predetermined player level that is set by the server using the management upper limit; and executing, by the player terminal and within the computer game, a battle game using a battle screen and the game character with the raised character level.

4. An information processing system comprising:

a computer processor;

a display device;

an input unit; and a memory connected to the computer processor, wherein the memory comprises a program configured to perform a method comprising:

obtaining, from a server over a communication network, a management upper limit for a player of a computer game, wherein the management upper limit sets a predetermined player level that cannot be exceeded by the player while operating the computer game;

displaying, on the display device, a game screen that presents a plurality of game characters for the computer game, wherein the game screen provides a user interface for selecting one or more game characters from among the plurality of game characters;

receiving, from the input unit, a first player input from the player for the computer game in response to displaying the game screen, wherein the first player input corresponds to a selection of a game character from among the plurality of game characters, and wherein the game character that is selected by the first player input corresponds to a character level in the computer game;

determining whether a special condition for the game character is satisfied within the computer game using list information, wherein the list information is obtained from the server over the communication network, wherein the list information comprises a character identifier (ID) associated with the game character, one or more required game items that are used for satisfying the special condition for the game character, and break-possible level information, and wherein the break-possible level information indicates a predetermined value that the character level of the game character increases beyond the predetermined player level in response to performing a limit break on the game character;

displaying, on the display device and in response to receiving the first player input, a character detail screen for the game character, wherein the character detail screen comprises a display area that comprises a tab for selecting the limit break for the game character, and wherein the tab is presented within the character detail screen in response to determining that the special condition is satisfied;

receiving, from the input unit, a second player input from the player for the computer game in response to displaying the tab within the character detail screen, wherein the second player input corresponds to a selection of the limit break for the game character;

displaying, on the display device and in response to receiving the second player input, a limit-break pop-up that comprises a cancel operation section, a limit-break decision operation section, and a message, wherein the message in the limit-break pop-up indicates the one or more required game items that are used to perform the limit break by the game character, wherein the cancel operation section causes the limit-break pop-up to close within the computer game, and wherein the limit-break decision operation section causes the limit break to be performed by the game character;

receiving, from the input unit, a third player input from the player for operating the limit-break decision operation section in the limit-break pop-up;

changing, in response to receiving the third player input for the limit-break decision operation section, the character level to produce a raised character level that exceeds the predetermined player level that is set by the server using the management upper limit; and executing, within the computer game, a battle game using a battle screen and the game character with the raised character level.

* * * * *